United States Patent
Hara et al.

(10) Patent No.: US 12,037,501 B2
(45) Date of Patent: Jul. 16, 2024

(54) PHOTOCURABLE INK COMPOSITION AND IMAGE RECORDING METHOD

(71) Applicant: FUJIFILM CORPORATION, Tokyo (JP)

(72) Inventors: Minako Hara, Kanagawa (JP); Misato Sasada, Kanagawa (JP); Daisuke Sasaki, Kanagawa (JP); Toshiyuki Makuta, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 448 days.

(21) Appl. No.: 17/464,720

(22) Filed: Sep. 2, 2021

(65) Prior Publication Data

US 2021/0395549 A1 Dec. 23, 2021

Related U.S. Application Data

(63) Continuation of application No. PCT/JP2019/044080, filed on Nov. 11, 2019.

(30) Foreign Application Priority Data

Mar. 29, 2019 (JP) .................................. 2019-066146

(51) Int. Cl.
| | | |
|---|---|---|
| B41J 11/00 | (2006.01) | |
| B41M 5/00 | (2006.01) | |
| B41M 7/00 | (2006.01) | |
| C09B 57/00 | (2006.01) | |
| C09D 5/32 | (2006.01) | |
| C09D 11/101 | (2014.01) | |
| C09D 11/322 | (2014.01) | |
| C09D 11/38 | (2014.01) | |

(52) U.S. Cl.
CPC ....... *C09D 11/322* (2013.01); *B41J 11/00216* (2021.01); *B41M 5/0023* (2013.01); *B41M 7/0081* (2013.01); *C09B 57/007* (2013.01); *C09D 5/32* (2013.01); *C09D 11/101* (2013.01); *C09D 11/38* (2013.01)

(58) Field of Classification Search
CPC .... B41J 2/01; B41J 11/00216; B41M 5/0023; B41M 7/0081; C09B 23/04; C09B 57/008; C09B 57/007; C09D 5/32; C09D 7/41; C09D 7/67; C09D 7/68; C09D 11/101; C09D 11/322; C09D 11/328; C09D 11/38; C08K 5/0041
See application file for complete search history.

(56) References Cited

U.S. PATENT DOCUMENTS

| 2018/0120485 A1 | 5/2018 | Oota et al. |
| 2019/0018174 A1 | 1/2019 | Ito et al. |
| 2020/0115556 A1 | 4/2020 | Sakamoto et al. |

FOREIGN PATENT DOCUMENTS

| CN | 104570605 A | | 4/2015 | |
| CN | 105462361 | * | 4/2016 | .............. B41M 5/00 |
| CN | 107533170 A | | 1/2018 | |
| EP | 3299422 A1 | | 3/2018 | |
| JP | 2000-345059 A | | 12/2000 | |
| JP | 2011081391 | * | 4/2011 | .............. G03F 7/004 |
| JP | 2013-188920 A | | 9/2013 | |
| JP | 2018-154672 A | | 10/2018 | |
| JP | 2019-1987 A | | 1/2019 | |
| JP | 2019-11455 A | | 1/2019 | |

(Continued)

OTHER PUBLICATIONS

Extended European Search Report dated Apr. 22, 2022, issued in corresponding EP Patent Application No. 19923072.3.

(Continued)

*Primary Examiner* — Anh T Vo
(74) *Attorney, Agent, or Firm* — SOLARIS Intellectual Property Group, PLLC

(57) ABSTRACT

Provided are: a photocurable ink composition including particles of a squarylium coloring agent represented by Formula (1) a radically polymerizable monomer, a radical polymerization initiator, and a coloring agent sensitizer, in which a volume average particle diameter of the particles of the squarylium coloring agent is 10 nm to 400 nm (in Formula (1), ring A and ring B: an aromatic ring or a heteroaromatic ring; $X^A$, $X^B$, $G^A$, and $G^B$: monovalent substituent; kA=integer of 0 to nA; kB=integer of 0 to nB; nA: an integer that is a maximum number of $G^A$ the ring A can have as its substituent; and nB: an integer that is a maximum number of $G^B$ the ring B can have as its substituent); and an image recording method.

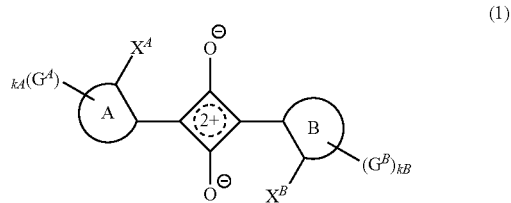

9 Claims, No Drawings

(56) References Cited

FOREIGN PATENT DOCUMENTS

JP          2019-99733 A     6/2019
WO       2010089943 A1   8/2010

OTHER PUBLICATIONS

English language translation of the following: Office action dated May 31, 2022 from the SIPO in a Chinese patent application No. 201980093789.0 corresponding to the instant patent application. This office action translation is submitted now in order to supplement understanding.
International Search Report issued in International Application No. PCT/JP2019/044080 on Dec. 24, 2019.
Written Opinion of the ISA issued in International Application No. PCT/JP2019/044080 on Dec. 24, 2019.
English language translation of the following: Office action dated Dec. 15, 2022 from the SIPO in a Chinese patent application No. 201980093789.0 corresponding to the instant patent application.

* cited by examiner

PHOTOCURABLE INK COMPOSITION AND IMAGE RECORDING METHOD

CROSS-REFERENCE TO RELATED APPLICATIONS

This application is a Continuation of International Application No. PCT/JP2019/044080, filed Nov. 11, 2019, which claims priority to Japanese Patent Application No. 2019-066146, filed Mar. 29, 2019. Each of the above applications is hereby expressly incorporated by reference, in its entirety, into the present application.

BACKGROUND OF THE INVENTION

1. Field of the Invention

The present disclosure relates to a photocurable ink composition and an image recording method.

2. Description of the Related Art

In recent years, a solvent-free ink jet recording method in which an ink which is curable by irradiation with radiation such as ultraviolet rays is applied to a desired material in an image pattern, and the ink applied in an image pattern is cured to record an image has been attracted attention.

According to an ink jet recording method using a curable ink, it is possible to draw on a non-absorbent recording medium using glass, metal, plastic, or the like. A curing mechanism is roughly classified into a radical polymerization type and a cationic polymerization type, and in the radical polymerization type, the mainstream is that the curing reaction proceeds by the action of radicals generated by irradiation with radiation such as ultraviolet rays.

Meanwhile, in various applications such as optical film applications such as infrared cut film for plasma display panels or solid-state imaging element (for example, Charge-Coupled Device; CCD), and heat ray shielding films; photothermal conversion applications such as flash melt fixing materials; security applications; and information display applications such as marks and codes, various studies have been conducted on using a coloring agent which has a property of absorbing or shielding light having an infrared wavelength region, specifically, a near-infrared absorbing coloring agent having an absorption wavelength in a near-infrared to infrared region.

Examples of the near-infrared absorbing coloring agent include a cyanine coloring agent, a phthalocyanine coloring agent, an anthraquinone coloring agent, and a diimmonium coloring agent. However, while the cyanine coloring agent and the diimmonium coloring agent are excellent in visible transparency, that is, invisibility, the cyanine coloring agent and the diimmonium coloring agent have low light resistance, and for example, a recorded image tends to deteriorate over time in a case of being adopted to an ink. In addition, while the phthalocyanine coloring agent and the anthraquinone coloring agent have light resistance, the phthalocyanine coloring agent and the anthraquinone coloring agent have absorption in a visible region and are inferior in invisibility.

As the near-infrared absorbing coloring agent, a squarylium coloring agent is also known.

For example, JP2019-11455A discloses that a squarylium compound having a specific structure absorbs less in the visible light region, has excellent near-infrared absorption ability, and has high light resistance. JP2019-11455A discloses that the squarylium compound having a specific structure is used for an electrophotographic toner or an ink for an ink jet printer.

In addition, JP2018-154672A discloses that, by using a squarylium-based compound and a pyrrolopyrrole-based compound in combination as a near-infrared absorbing coloring agent, high invisibility can be obtained and light resistance is also excellent.

SUMMARY OF THE INVENTION

The invisibility-imparted ink is required to have a certain level of light resistance similar to an ink used for recording a visible image. Among near-infrared absorbing coloring agents, the squarylium coloring agent is generally considered to have high resistance to light.

However, for example, in a case where an image is irradiated with light such as a fluorescent lamp for a long time, even with the prior art disclosed in JP2019-11455A and JP2018-154672A, the image is easily deteriorated by high-energy short-wavelength light, and even in a case where the squarylium coloring agent is used, the image cannot always be stably retained for a long period of time.

In a situation in which the ink has low resistance to light, for example, deterioration of the coloring agent begins in an image recording process, and deterioration of the image after recording tends to progress over time. In particular, in a case of a curable ink which is cured by irradiation with ultraviolet rays or the like, a process of curing the ink by irradiation with ultraviolet rays or the like is provided in the image recording process. It is presumed that the coloring agent begins to deteriorate even in this process. That is, it is not possible to maintain the recording function which the ink should originally have.

As described above, in a case of being irradiated with light such as a fluorescent lamp, since the irradiation causes generation of radicals due to a photopolymerization initiator, it is presumed that the radicals generated start slightly deteriorating the coloring agent during and after the recording of the image, and as a result, deterioration of the ink progresses, and durability of the recorded image is likely to be impaired.

The present disclosure has been made in view of the above.

According to one embodiment of the present disclosure, a photocurable ink composition which has a higher infrared (IR) absorption ability after photocuring and an excellent light resistance of an infrared absorbing image, as compared with photocurable ink compositions in the related art, is provided.

According to another embodiment of the present disclosure, an image recording method that can record an image which has a higher infrared (IR) absorption ability after photocuring and an excellent light resistance of an infrared absorbing image, as compared with photocurable ink compositions in the related art, is provided.

The present disclosure includes the following aspects.

<1> A photocurable ink composition comprising:
particles of a squarylium coloring agent represented by Formula (1);
a radically polymerizable monomer;
a radical polymerization initiator; and
a coloring agent sensitizer,
in which a volume average particle diameter of the particles of the squarylium coloring agent is 10 nm to 400 nm,

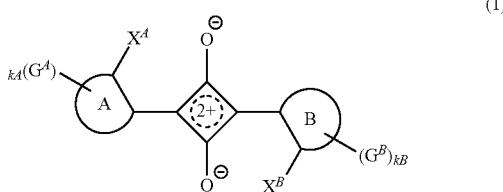
(1)

In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to nA, kB represents an integer of 0 to nB, nA represents an integer that is a maximum number of $G^A$ the ring A can have as its substituent, nB represents an integer that is a maximum number of $G^B$ the ring B can have as its substituent, $X^A$ and $G^A$ or $X^B$ and $G^B$ may be bonded to each other to form a ring, and in a case where a plurality of $G^A$'s or a plurality of $G^B$'s are present, the plurality of $G^A$'s bonded to the ring A and the plurality of $G^B$'s bonded to the ring B may be bonded to each other to form a ring structure.

<2> The photocurable ink composition according to <1>, in which the coloring agent sensitizer includes at least one of a thioxanthone-based compound or a thiochromanon-based compound.

<3> The photocurable ink composition according to <1> or <2>,
in which at least one of the coloring agent sensitizer has a molecular weight of 1000 or more.

<4> The photocurable ink composition according to any one of <1> to <3>,
in which a content of the squarylium coloring agent is 0.1% by mass to 20% by mass with respect to a total mass of the ink composition.

<5> The photocurable ink composition according to any one of <1> to <4>,
in which the radically polymerizable monomer includes a bi- or higher functional radically polymerizable monomer, and
a content of the bi- or higher functional radically polymerizable monomer is 50% by mass or more with respect to a total content of the radically polymerizable monomer.

<6> The photocurable ink composition according to any one of <1> to <5>,
in which a ratio of a content of the coloring agent sensitizer to a content of the squarylium coloring agent is 1 to 20 on a mass basis.

<7> The photocurable ink composition according to any one of <1> to <6>,
in which the particles of the squarylium coloring agent are present in a dispersed state.

<8> The photocurable ink composition according to any one of <1> to <7>,
in which the radically polymerizable monomer includes a monofunctional radically polymerizable monomer and at least one monomer selected from the group consisting of a bifunctional radically polymerizable monomer and a trifunctional radically polymerizable monomer.

<9> The photocurable ink composition according to any one of <1> to <8>,
in which the photocurable ink composition is used for ink jet recording.

<10> An image recording method comprising:
applying the photocurable ink composition according to any one of <1> to <9> to a base material; and
irradiating the photocurable ink composition applied to the base material with light by a light emitting diode to record an infrared absorbing image.

According to one embodiment of the present disclosure, a photocurable ink composition which has a higher infrared (IR) absorption ability after photocuring and an excellent light resistance of an infrared absorbing image, as compared with photocurable ink compositions in the related art, is provided.

According to another embodiment of the present disclosure, an image recording method that can record an image which has a higher infrared (IR) absorption ability after photocuring and an excellent light resistance of an infrared absorbing image, as compared with photocurable ink compositions in the related art, is provided.

DESCRIPTION OF THE PREFERRED EMBODIMENTS

Hereinafter, a photocurable ink composition according to an embodiment of the present disclosure and an image recording method using the same will be described in detail.

In the present specification, the numerical ranges shown using "to" means ranges including the numerical values described before and after "to" as the minimum value and the maximum value.

In a range of numerical values described in stages in the present specification, the upper limit value or the lower limit value described in one range of numerical values may be replaced with an upper limit value or a lower limit value of the range of numerical values described in other stages. In addition, in a range of numerical values described in the present specification, the upper limit value or the lower limit value of the range of numerical values may be replaced with values shown in the examples.

In the present specification, in a case where the amount of each component in a composition is referred to, and in a case where a plurality of substances corresponding to each component in the composition are present, it means the total amount of a plurality of components present in the composition, unless otherwise specified.

In the present specification, the term "solid content" means a component excluding a solvent, and liquid components such as low molecular weight components other than the solvent are also included in the "solid content".

In the present specification, the term "solvent" is used to include water, an organic solvent, and a mixed solvent of water and an organic solvent.

In addition, in the present specification, either or both of acrylic and methacrylic may be referred to as "(meth) acrylic".

In the present specification, the meaning of the term "step" includes not only an independent step but also a step whose intended purpose is achieved even in a case where the step is not clearly distinguished from other steps.

Photocurable Ink Composition

The photocurable ink composition (hereinafter, also simply referred to as an "ink composition") according to the embodiment of the present disclosure includes particles of a squarylium coloring agent represented by Formula (1), a radically polymerizable monomer, a radical polymerization initiator, and a coloring agent sensitizer (hereinafter, may be simply abbreviated as a "sensitizer"), in which an average particle diameter of the particles of the squarylium coloring agent is in a range of 10 nm to 400 nm.

The photocurable ink composition according to the embodiment of the present disclosure is an ink composition which is cured by being irradiated with light, and is suitably used for applications requiring invisibility.

The use mode of the photocurable ink composition according to the embodiment of the present disclosure is not particularly limited, and may be appropriately selected from various modes using, for example, a known coating method or an ink jet method, depending on the intended use. However, the photocurable ink composition according to the embodiment of the present disclosure is suitably used for ink jet recording using the ink jet method.

In the related art, in a field in which invisibility is required, various image recording methods using a coloring agent having no absorption in a visible region or little absorption in the visible region have been studied. For example, as a near-infrared absorbing coloring agent for which a technique using a near-infrared absorbing coloring agent has been proposed, a cyanine coloring agent, a phthalocyanine coloring agent, an anthraquinone coloring agent, a diimmonium coloring agent, and a squarylium coloring agent have been known. Among these, the squarylium coloring agent has been attracted attention as it has high invisibility and light resistance. However, even in an image using the squarylium coloring agent, deterioration cannot be suppressed in a case where the image is affected by a short wavelength light irradiated during image recording or in a case where the image is exposed to light such as a fluorescent lamp for a long time, and for example, it is difficult to maintain stable detectability of invisible images for a long period of time.

In the photocurable ink composition according to the embodiment of the present disclosure, since the particles of the squarylium coloring agent, the coloring agent sensitizer, and the radically polymerizable monomer are used in combination, infrared (IR) absorption ability after photocuring is higher and light resistance of an infrared absorbing image is excellent, as compared with photocurable ink compositions in the related art. That is, by selecting a squarylium coloring agent having high light resistance and including the squarylium coloring agent as particles (preferably, in a dispersed state) without dissolving the squarylium coloring agent, resistance to light exposed during and after recording (particularly, light resistance) is dramatically improved. In addition, by using the coloring agent sensitizer together, required curing properties can be obtained even in a case where an LED having high energy and less unnecessary short wavelength light is used, and effect of improving the light resistance of the infrared absorbing image can be further enhanced.

As described above, the photocurable ink composition according to the embodiment of the present disclosure is suitable as a radical curable ink adopted to a recording process in which recording is performed through a process of curing by irradiating with light, and it is expected to be adopted to a wide range of applications because the photocurable ink composition according to the embodiment of the present disclosure has both IR absorption ability and light resistance of the infrared absorbing image.

Particles of Squarylium Coloring Agent

The photocurable ink composition according to the embodiment of the present disclosure contains at least one kind of particles of a squarylium coloring agent represented by Formula (1).

Since the photocurable ink composition according to the embodiment of the present disclosure contains the squarylium coloring agent as a coloring agent, invisibility is imparted, photodecomposition of the coloring agent in the curing process is suppressed, and IR absorption ability is excellent. In addition, since the squarylium coloring agent is contained in the ink composition in a form of particles, resistance to light exposed before and after recording is excellent.

The particles of the squarylium coloring agent have a volume average particle diameter in a range of 10 nm to 400 nm.

In a case where the volume average particle diameter of the particles of the squarylium coloring agent is 10 nm or more, it is possible to maintain good resistance to light exposed during and after recording (particularly, light resistance). In addition, in a case where the average particle diameter of the particles is 400 nm or less, it is suitable for stably maintaining jettability of the ink composition in a case of being used for ink jet recording.

The volume average particle diameter of the particles of the squarylium coloring agent is preferably 15 nm or more, more preferably 20 nm or more, and still more preferably 50 nm or more. In addition, the average particle diameter of the particles of the squarylium coloring agent is preferably 300 nm or less and more preferably 200 nm or less.

The volume average particle diameter of the particles of the squarylium coloring agent refers to a particle diameter of the particles themselves, and in a case where an additive such as a dispersant is attached to the particles, the volume average particle diameter thereof refers to a particle diameter to which the additive is attached.

The volume average particle diameter of the particles can be measured by a dynamic light scattering method using a nanotrac UPA particle size analyzer (trade name: "UPA-EX150", manufactured by Nikkiso Co., Ltd.) as a measuring device. The measurement can be carried out by placing 3 ml of particle dispersion in a measurement cell and following a predetermined measuring method. As parameters to be input in the measurement, the viscosity of the ink composition is used for a viscosity, and the density of the squarylium coloring agent is used for a density of particles.

The volume average particle diameter of the particles of the squarylium coloring agent can be adjusted according to dispersion conditions of the squarylium coloring agent, specifically, the type of the dispersant, the concentration of the squarylium coloring agent, the combination of the radically polymerizable monomer and the dispersant, and the like.

It is preferable that the particles of the squarylium coloring agent are present in a dispersed state.

In a case where the particles of the squarylium coloring agent are dispersed, the squarylium coloring agent tends to exist in a state where particles are aggregated, and irradiated light is shielded by some particles. As a result, compared with a case where the coloring agent is in a dissolved state, it is considered that the number of particles exposed to light is small, and light resistance is improved by the presence of the coloring agent in a dispersed state.

The squarylium coloring agent in the present disclosure is a compound represented by Formula (1).

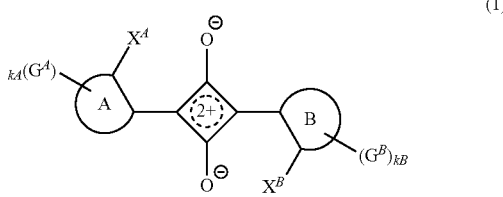

(1)

In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to nA, kB represents an integer of 0 to nB, nA represents an integer that is a maximum number of $G^A$ the ring A can have as its substituent, nB represents an integer that is a maximum number of $G^B$ the ring B can have as its substituent, $X^A$ and $G^A$ or $X^B$ and $G^B$ may be bonded to each other to form a ring, and in a case where a plurality of $G^A$'s or a plurality of $G^B$'s are present, the plurality of $G^A$'s bonded to the ring A and the plurality of $G^B$'s bonded to the ring B may be bonded to each other to form a ring structure.

$G^A$ and $G^B$ each independently represent a monovalent substituent.

Examples of the monovalent substituent include a halogen atom, a cyano group, a nitro group, an alkyl group, an alkenyl group, an alkynyl group, an aryl group, a heteroaryl group, an aralkyl group, $-OR^{10}$, $-COR^{11}$, $-COOR^{12}$, $-OCOR^{13}$, $-NR^{14}R^{15}$, $-NHCOR^{16}$, $-CONR^{17}R^{18}$, $-NHCONR^{19}R^{20}$, $-NHCOOR^{21}$, $-SR^{22}$, $-SO_2R^{23}$, $-SO_2OR^{24}$, $-NHSO_2R^{25}$, and $SO_2NR^{26}R^{27}$.

$R^{10}$ to $R^{27}$ each independently represent a hydrogen atom, an aliphatic group, an aromatic group, or a heterocyclic group.

In a case where $R^{12}$ in $-COOR^{12}$ is a hydrogen atom (that is, a carboxy group), the hydrogen atom may be dissociated (that is, a carbonate group) or may be in a state of salt. In addition, in a case where $R^{24}$ in $-SO_2OR^{24}$ is a hydrogen atom (that is, a sulfo group), the hydrogen atom may be dissociated (that is, a sulfonate group) or may be in a state of salt.

Examples of the halogen atom include a fluorine atom, a chlorine atom, a bromine atom, and an iodine atom.

The number of carbon atoms in the alkyl group is preferably 1 to 20, more preferably 1 to 15, and still more preferably 1 to 8. The alkyl group may be linear, branched, or cyclic, and is preferably linear or branched.

The number of carbon atoms in the alkenyl group is preferably 2 to 20, more preferably 2 to 12, and particularly preferably 2 to 8. The alkenyl group may be linear, branched, or cyclic, and is preferably linear or branched.

The number of carbon atoms in the alkynyl group is preferably 2 to 40, more preferably 2 to 30, and particularly preferably 2 to 25. The alkynyl group may be linear, branched, or cyclic, and is preferably linear or branched.

The number of carbon atoms in the aryl group is preferably 6 to 30, more preferably 6 to 20, and still more preferably 6 to 12.

An alkyl portion in the aralkyl group is the same as the above-described alkyl group. An aryl portion in the aralkyl group is the same as the above-described aryl group. The number of carbon atoms in the aralkyl group is preferably 7 to 40, more preferably 7 to 30, and still more preferably 7 to 25.

The heteroaryl group is preferably a single ring or a fused ring, preferably a single ring or a fused ring composed of 2 to 8 rings, and more preferably a single ring or a fused ring composed of 2 to 4 rings. The number of heteroatoms constituting a ring of the heteroaryl group is preferably 1 to 3. As the heteroatom constituting the ring of the heteroaryl group, a nitrogen atom, an oxygen atom, or a sulfur atom is preferable. It is preferable that the heteroaryl group is a 5-membered ring or a 6-membered ring. The number of carbon atoms constituting the ring of the heteroaryl group is preferably 3 to 30, more preferably 3 to 18, and more preferably 3 to 12. Examples of the heteroaryl group include a pyridine ring, a piperidine ring, a furan ring group, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, and a thiadiazole ring.

The alkyl group, the alkenyl group, the alkynyl group, the aralkyl group, the aryl group, and the heteroaryl group may have a substituent or may be unsubstituted.

Examples of the substituent include substituents described in paragraph 0030 of JP2018-154672A. The substituent is preferably a substituent selected from the group consisting of an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, an alkylthio group, an arylthio group, an aromatic heterocyclic thio group, a sulfonyl group, a hydroxy group, a mercapto group, a halogen atom, a cyano group, a sulfo group, and a carboxy group, and among these, a substituent selected from the group consisting of an alkyl group, an aryl group, an alkoxy group, an aryloxy group, an aromatic heterocyclic oxy group, an acyl group, an alkoxycarbonyl group, an aryloxycarbonyl group, an acyloxy group, an alkylthio group, an arylthio group, an aromatic heterocyclic thio group, a sulfonyl group, a hydroxy group, a mercapto group, a halogen atom, a cyano group, a sulfo group, and a carboxy group is more preferable.

The "carbon number" of the substituent means the "total carbon number" of the substituent.

In addition, with regard to details of each substituent, reference can be made to substituents described in paragraphs 0031 to 0035 of JP2018-154672A.

$X^A$ and $X^B$ each independently represent a monovalent substituent.

As the substituent of $X^A$ and $X^B$, a group having an active hydrogen is preferable, $-OH$, $-SH$, $-COOH$, $-SO_3H$, $-NR^{X1}R^{X2}$, $-NHCOR^{X1}$, $-CONR^{X1}R^{X2}$, $-NHCONR_{X1}R^{X2}$, $-NHCOOR^{X1}$, $-NHSO_2R^{X1}$, $-B(OH)_2$, or $PO(OH)_2$ is more preferable, and $-OH$, $-SH$, or $NR^{X1}R^{X2}$ is still more preferable.

$R^{X1}$ and $R^{X2}$ each independently represent a hydrogen atom or a monovalent substituent. Examples of the substituent include an alkyl group, an alkenyl group, an alkynyl group, an aryl group, and a heteroaryl group, and an alkyl group is preferable. The alkyl group is preferably linear or branched. Details of the alkyl group, alkenyl group, alkynyl group, aryl group, and heteroaryl group are synonymous with the ranges described in G and $G^B$.

The ring A and the ring B each independently represent an aromatic ring or a heteroaromatic ring.

The aromatic ring and heteroaromatic ring may be a single ring or a fused ring.

Specific examples of the aromatic ring and heteroaromatic ring include a benzene ring, a naphthalene ring, a pentalene ring, an indene ring, an azulene ring, a heptalene ring, an indecene ring, a perylene ring, a pentacene ring, an acetaphthalene ring, a phenanthrene ring, an anthracene ring, a naphthacene ring, a chrysene ring, a triphenylene ring, a fluorene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indridine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxthin ring, a phenothiazine ring, and a phenazine ring, and a benzene ring or a naphthalene ring is preferable.

The aromatic ring may be unsubstituted or may have a substituent. Examples of the substituent include the substituents described in $G^A$ and $G^B$.

$X^A$ and $G^A$, or $X^B$ and $G^B$ may be bonded to each other to form a ring, and in a case where a plurality of $G^A$'s or a plurality of $G^B$'s are present, the plurality of $G^A$'s and the plurality of GBs may be bonded to each other to form a ring.

It is preferable that the ring is a 5-membered ring or a 6-membered ring. The ring may be a single ring or a complex ring.

In a case where $X^A$ and $G^A$, $X^B$ and $G^B$, $G^A$'s, or $G^B$'s are bonded to each other to form a ring, these may be directly bonded to form a ring, or may be bonded through a divalent linking group selected from the group consisting of an alkylene group, —CO—, —O—, —NH—, —BR—, and a combination thereof to form a ring. It is preferable that $X^A$ and $G^A$, $X^B$ and $G^B$, $G^A$'s, or $G^B$'s are bonded to each other through —BR— to form a ring.

R represents a hydrogen atom or a monovalent substituent. Examples of the substituent include the substituents described in $G^A$ and $G^B$, and an alkyl group or an aryl group is preferable.

kA represents an integer of 0 to nA, kB represents an integer of 0 to nB, nA represents the maximum integer substitutable for the ring A, and nB represents the maximum integer substitutable for the ring B.

kA and kB are each independently preferably 0 to 4, more preferably 0 to 2, and particularly preferably 0 or 1. In addition, it is preferable not to include a case where kA and kB simultaneously represent 0 (zero).

Among the squarylium coloring agents represented by Formula (1), a compound represented by Formula (2) is preferable from the viewpoint of resistance to light.

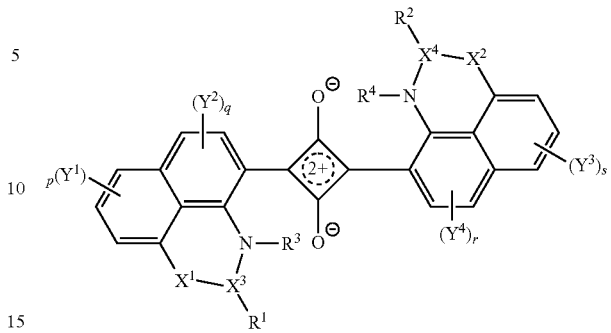

(2)

In Formula (2), $R^1$ and $R^2$ each independently represent a monovalent substituent, and $R^3$ and $R^4$ each independently represent a hydrogen atom or an alkyl group.

$X^1$ and $X^2$ each independently represent an oxygen atom or —N($R^5$)—, and $X^3$ and $X^4$ each independently represent a carbon atom or a boron atom.

$R^5$ represents a hydrogen atom, an alkyl group, an aryl group, or a heteroaryl group, $Y^1$, $Y^2$, $Y^3$, and $Y^4$ each independently represent a monovalent substituent, and $Y^1$ and $Y^2$, or $Y^3$ and $Y^4$ may be bonded to each other to form a ring.

In a case where a plurality of $Y^1$'s, a plurality of $Y^2$'s, a plurality of $Y^3$'s, or a plurality of $Y^4$'s are present, the plurality of $Y^1$'s, the plurality of $Y^2$'s, the plurality of $Y^3$'s, and the plurality of $Y^4$'s may be bonded to each other to form a ring.

p and s each independently represent an integer of 0 to 3, and q and r each independently represent an integer of 0 to 2.

Examples of the substituent represented by $R^1$, $R^2$, $Y^1$, $Y^2$, $Y^3$, and $Y^4$ include the same substituents described in $G^A$ and $G^B$.

$R^3$ and $R^4$ each independently represent a hydrogen atom or an alkyl group. The number of carbon atoms in the alkyl group of $R^3$ is, for example, 1 to 4, preferably 1 or 2. The alkyl group may be linear or branched. Specific examples thereof include a methyl group, an ethyl group, a propyl group, an isopropyl group, a butyl group, and an isobutyl group. $R^3$ is preferably a hydrogen atom, a methyl group, or an ethyl group, more preferably a hydrogen atom or a methyl group, and particularly preferably a hydrogen atom.

$X^1$ and $X^2$ each independently represent an oxygen atom (—O—) or —N($R^5$)—. $X^1$ and $X^2$ may be the same or different from each other, but it is preferable that $X^1$ and $X^2$ are the same.

$R^5$ represents a hydrogen atom, an alkyl group, an aryl group, or a heteroaryl group.

$R^5$ is preferably a hydrogen atom, an alkyl group, or an aryl group, and more preferably a hydrogen atom or an alkyl group. The alkyl group, aryl group, and heteroaryl group represented by $R^5$ may be unsubstituted or may have a monovalent substituent. Examples of the monovalent substituent include the monovalent substituents described in $G^A$ and $G^B$.

The number of carbon atoms in the alkyl group is preferably 1 to 20, more preferably 1 to 10, still more preferably 1 to 4, and particularly preferably 1 or 2. The alkyl group may be linear or branched.

The number of carbon atoms in the aryl group is preferably 6 to 20 and more preferably 6 to 12.

The heteroaryl group may be monocyclic or polycyclic. The number of heteroatoms constituting a ring of the heteroaryl group is preferably 1 to 3. As the heteroatom constituting the ring of the heteroaryl group, a nitrogen atom, an oxygen atom, or a sulfur atom is preferable. The number of carbon atoms constituting the ring of the heteroaryl group is preferably 3 to 30, more preferably 3 to 18, and more preferably 3 to 12.

The molecular weight of the squarylium coloring agent represented by Formula (1) or Formula (2) described above is preferably in a range of 100 to 2,000 and more preferably in a range of 150 to 1,000.

The squarylium coloring agent represented by Formula (2) is described in detail in JP2011-208101A, and the compound described therein can be suitably used as the squarylium coloring agent in the present disclosure.

Specific examples (specific examples B-1 to B-40) of the squarylium coloring agent represented by Formula (1) or Formula (2) described above are shown below. However, the present disclosure is not limited to the following compounds. In the formulae, "Me" represents a methyl group, and "Ph" represents a phenyl group.

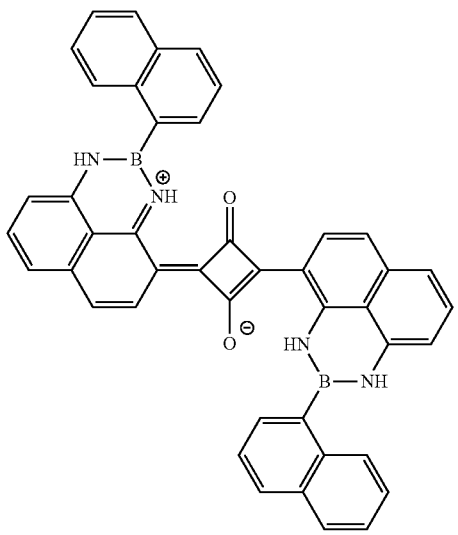
B-3

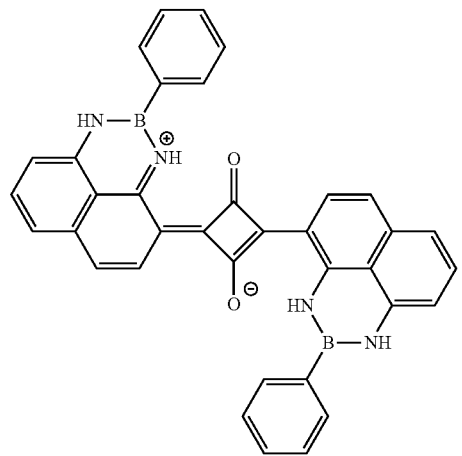
B-1

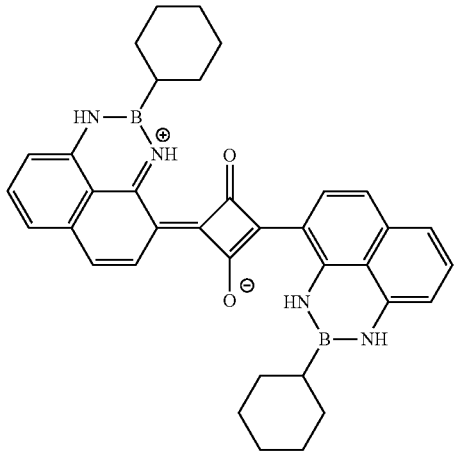
B-4

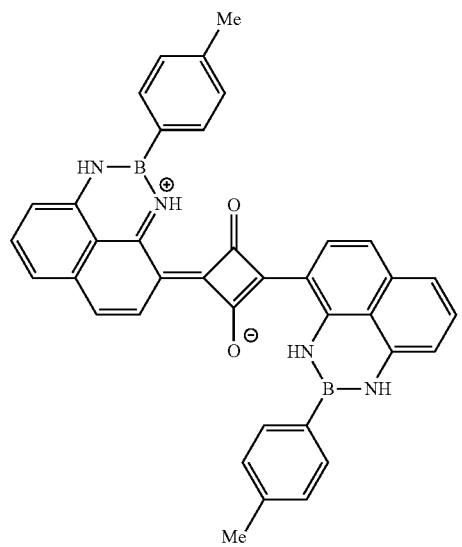
B-2

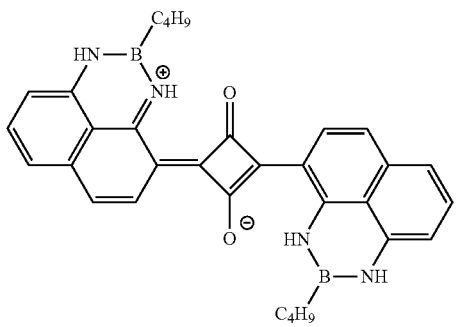
B-5

-continued
B-6
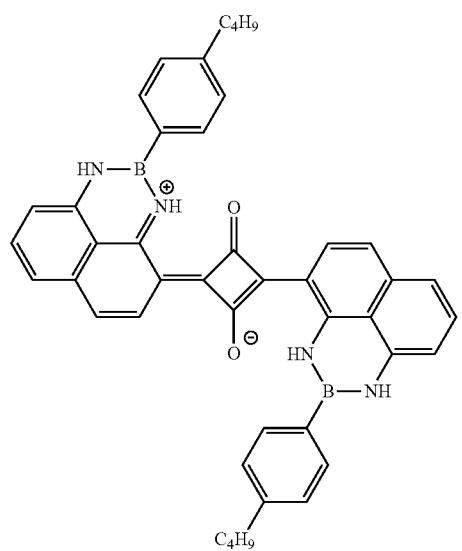
B-8
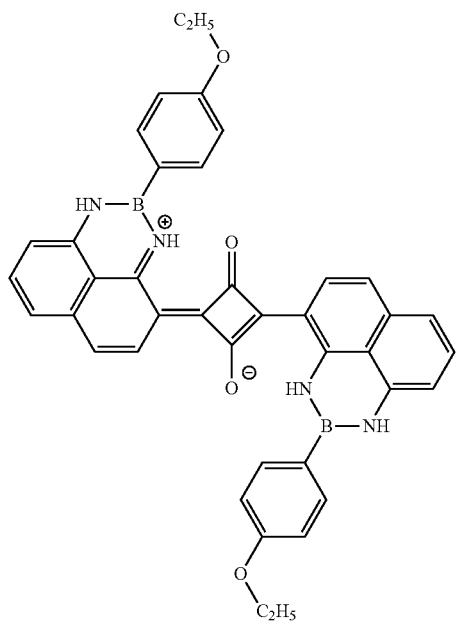
B-7
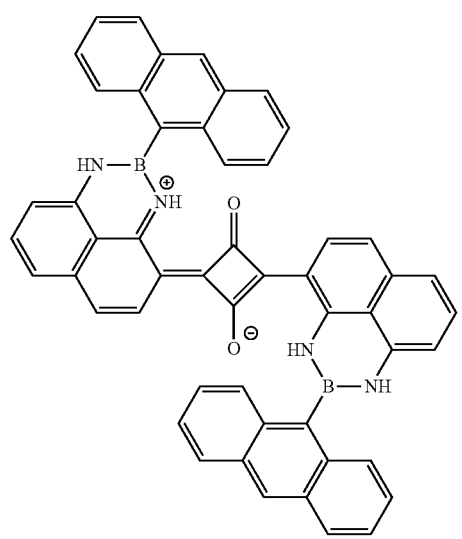
B-9
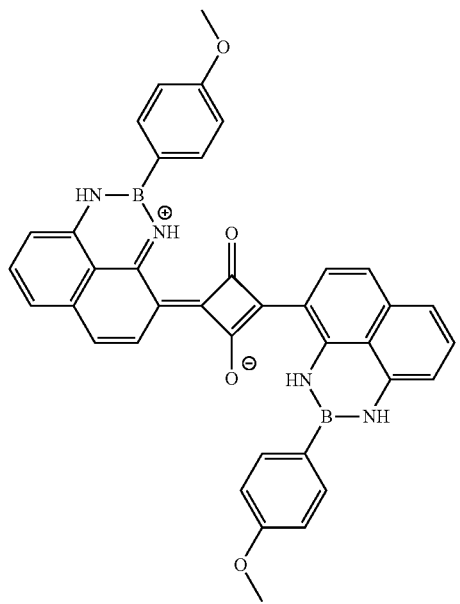

B-10
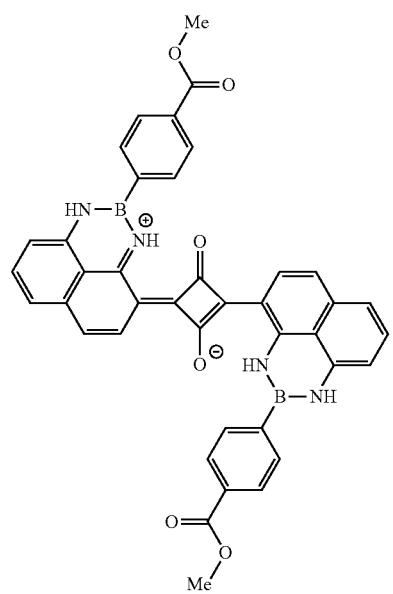
B-11
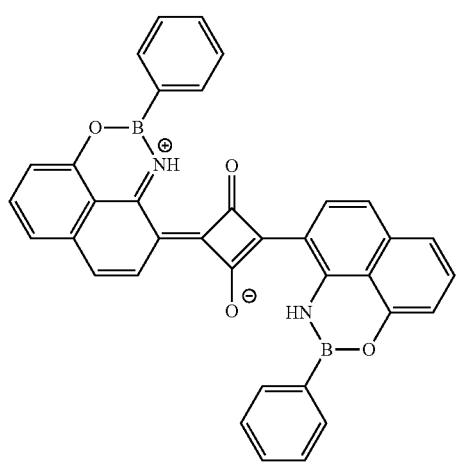
B-12
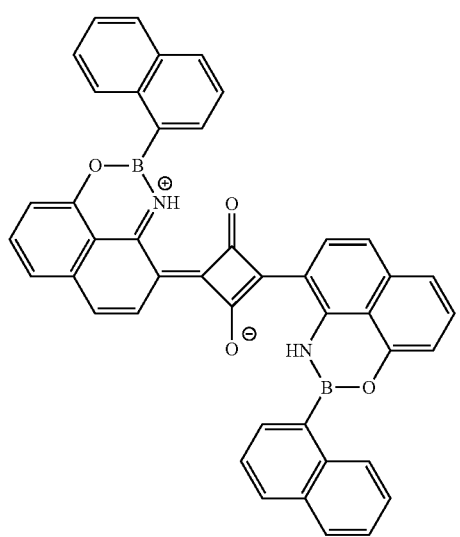
B-13
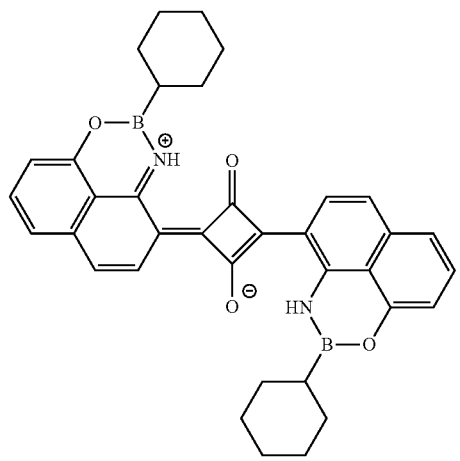
B-14
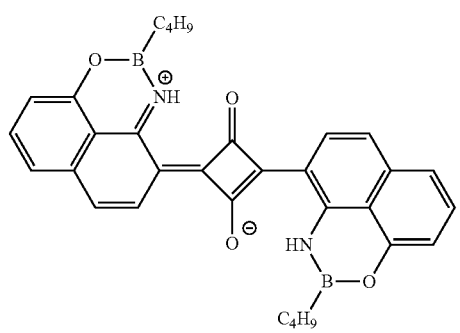
B-15
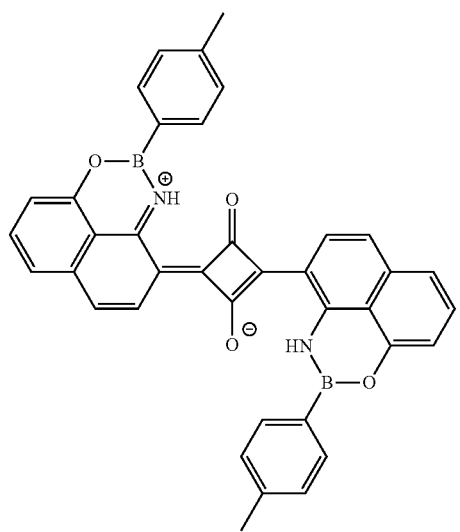

B-16
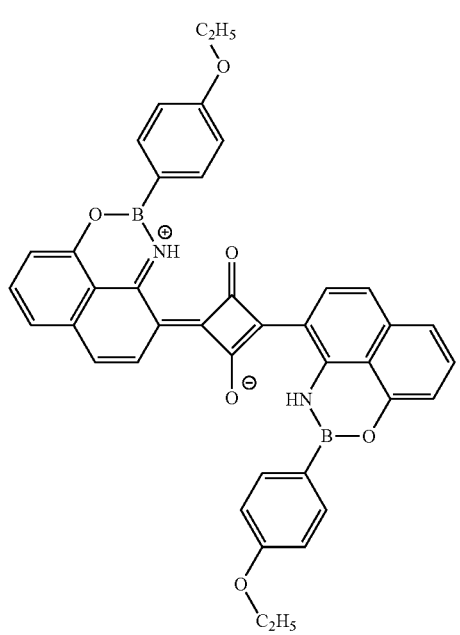
B-19
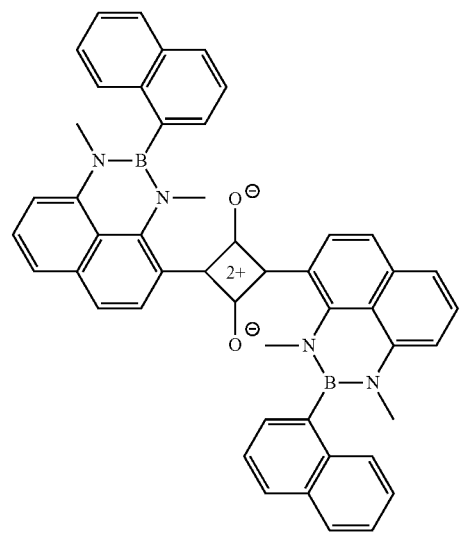
B-17
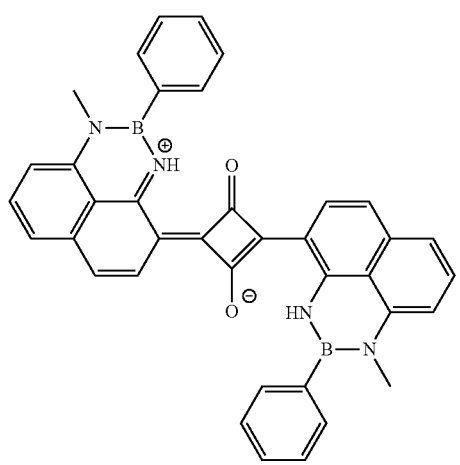
B-20
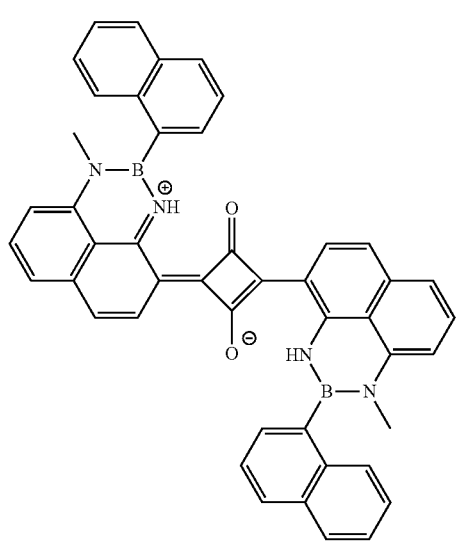
B-18
B-21
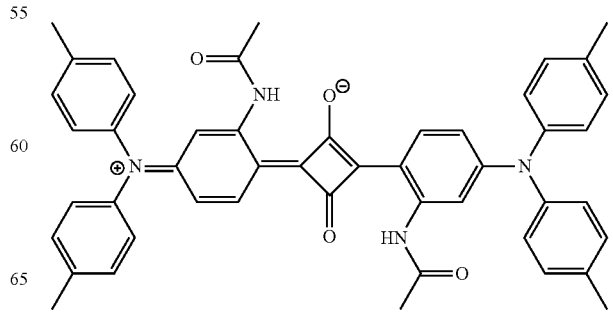

B-22
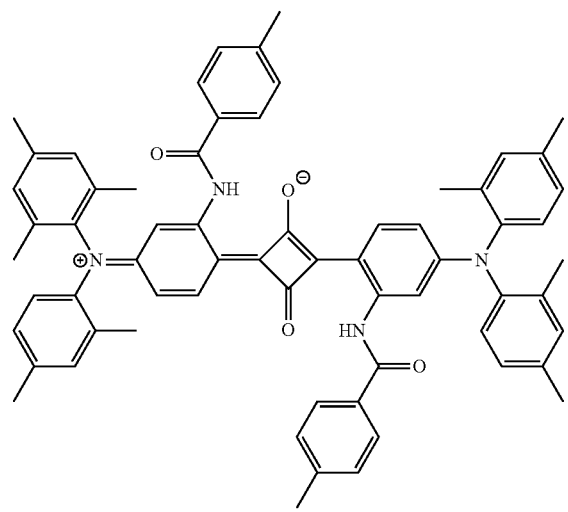
B-26
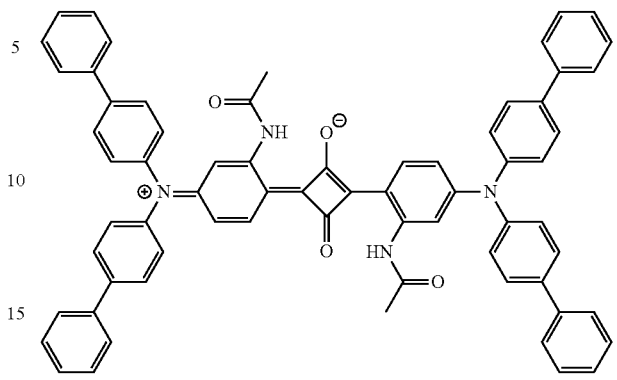
B-23
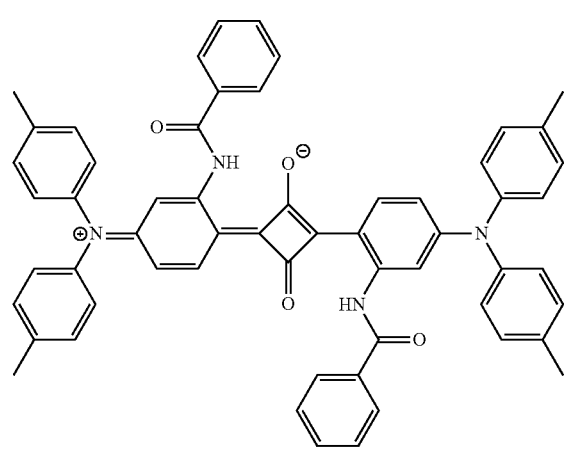
B-27
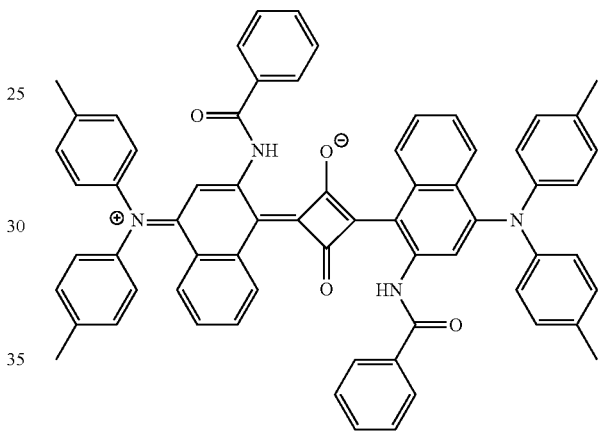
B-24
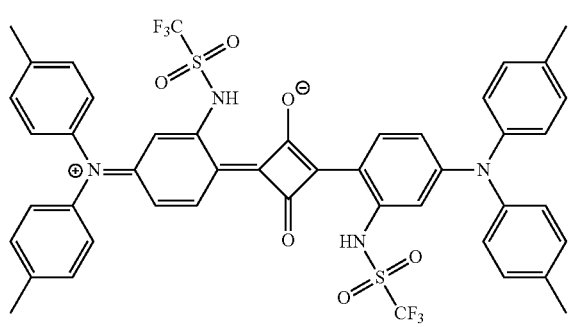
B-28
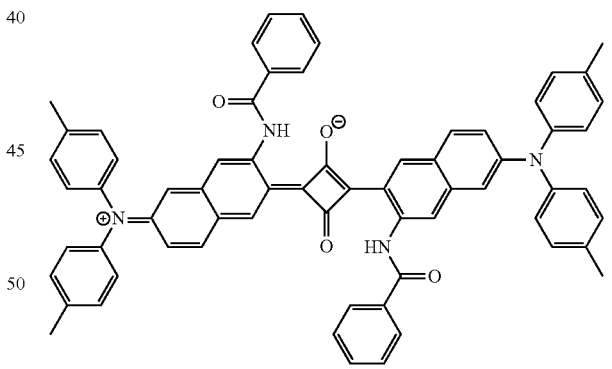
B-25
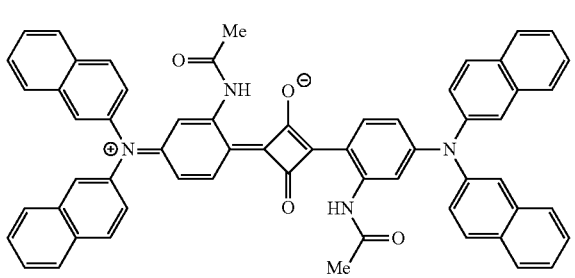
B-29
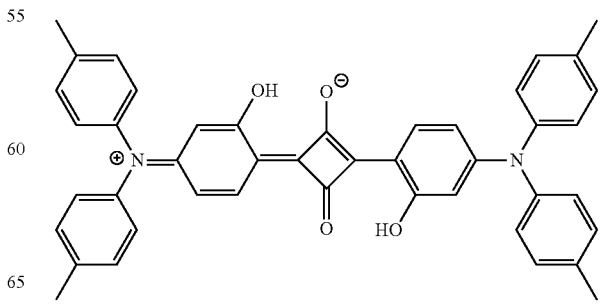

B-30
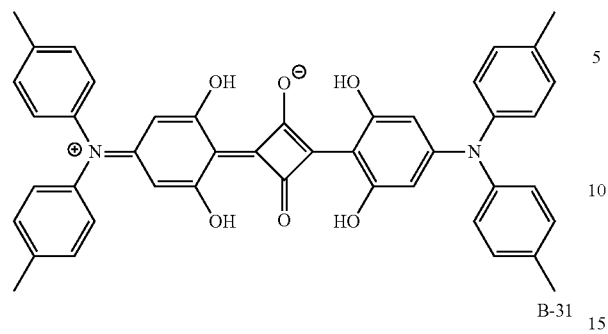
B-31
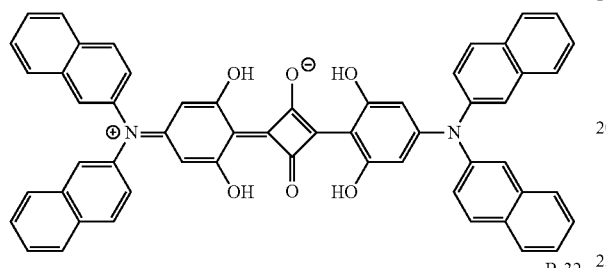
B-32
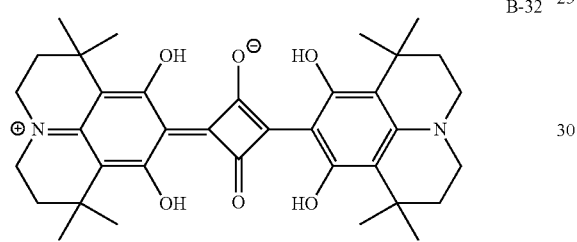
B-33
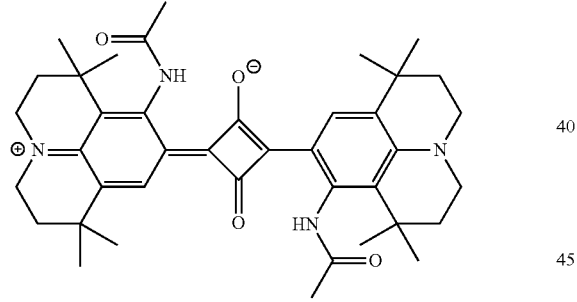
B-34
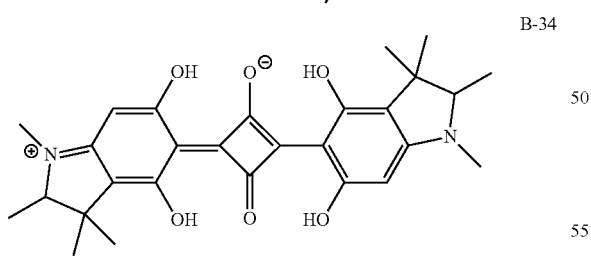
B-35
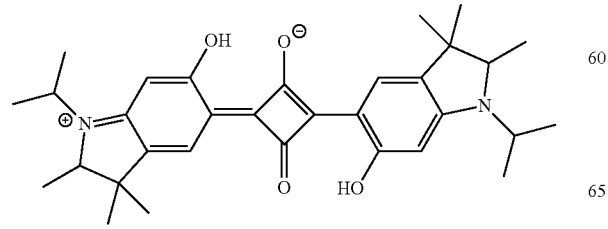
B-36
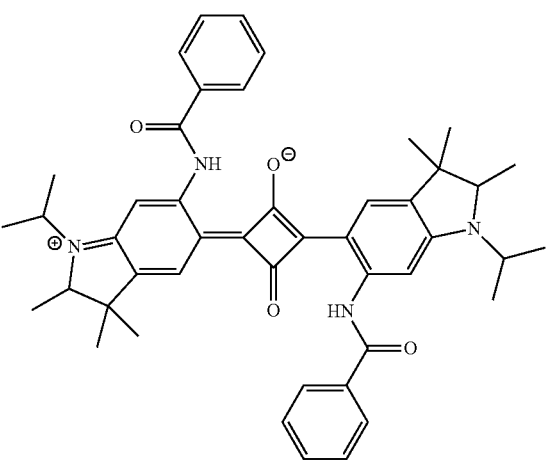
B-37
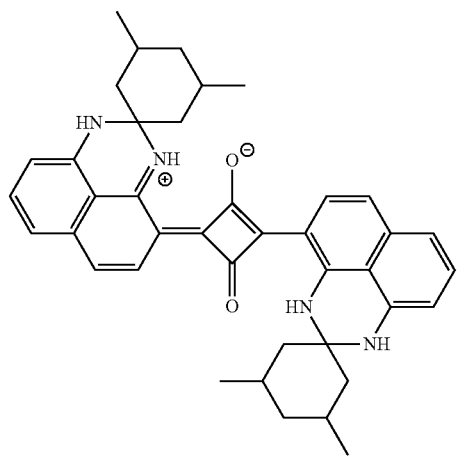
B-38
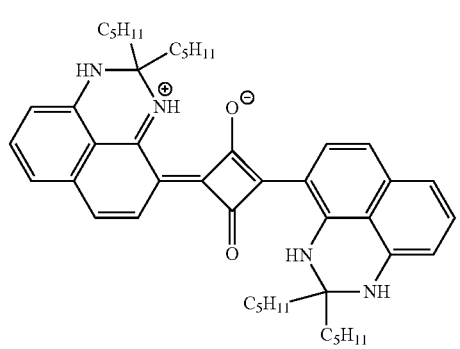
B-39
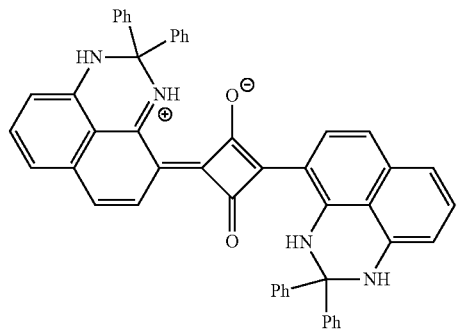

-continued

B-40

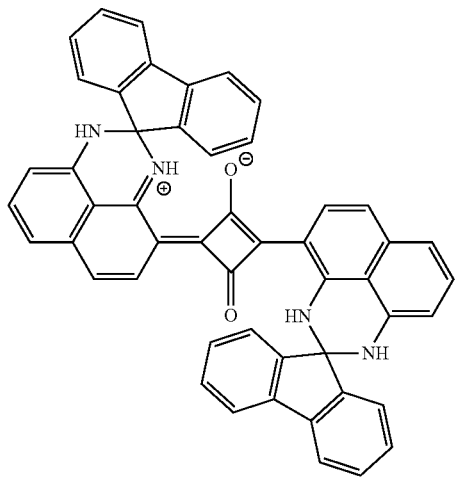

Among the above, as more preferred compounds, specific examples B-1, B-3, B-4, B-6, B-9, B-11, B-21, B-24, B-30, B-31, B-37, and B-38 can be mentioned.

The content of the squarylium coloring agent is preferably in a range of 0.1% by mass to 20% by mass, more preferably in a range of 0.1% by mass to 10% by mass, and still more preferably 0.3% by mass to 7% by mass with respect to the total mass of the photocurable ink composition.

In a case where the content of the squarylium coloring agent is 0.1% by mass or more, IR absorption is excellent and light resistance is more excellent. In addition, in a case where the content of the squarylium coloring agent is 20% by mass or less, it is advantageous in terms of jetting stability.

Dispersant

The photocurable ink composition can contain a dispersant for dispersing the squarylium coloring agent. By containing the dispersant, dispersibility of the squarylium coloring agent is improved, and the diameter of the dispersed particles of the squarylium coloring agent can be reduced.

With regard to the dispersant, reference can be appropriately made to known documents, for example, paragraphs 0152 to 0158 of JP2011-225848A, paragraphs 0132 to 0149 of JP2009-209352A, and the like.

Specifically, examples of the dispersant include SOL-SPERSE (registered trademark) series (for example, SOL-SPERSE 16000, 21000, 32000, 41000, 41090, 43000, 44000, 46000, 54000, and the like) of Lubrizol Corporation; DISPERBYK (registered trademark) series (for example, DISPERBYK 102, 110, 111, 118, 170, 190, 194N, 2015, 2090, 2096, and the like) of BYK Chemie; TEGO (registered trademark) Dispers series (for example, TEGO Dispers 610, 610S, 630, 651, 655, 750W, 755W, and the like) of EVONIK; DISPARLON (registered trademark) series (for example, DA-375, DA-1200, and the like) of Kusumoto Chemicals, Ltd.; and Flowlen series (for example, WK-13E, G-700, G-900, GW-1500, GW-1640, WK-13E, and the like) of KYOEISHA CHEMICAL Co., LTD.

The molecular weight of the dispersant is preferably 0.1% by mass to 20% by mass, more preferably 0.3% by mass to 10% by mass, and still more preferably 0.3% by mass to 5% by mass with respect to the total amount of the photocurable ink composition.

In a case where the photocurable ink composition contains a dispersant for dispersing the squarylium coloring agent, the ratio of the content of the dispersant to the content of the squarylium coloring agent is preferably 15% to 100%, more preferably 20% to 55%, and still more preferably 25% to 45% on a mass basis.

Radically Polymerizable Monomer

The photocurable ink composition according to the embodiment of the present disclosure contains at least one radically polymerizable monomer. By containing the radically polymerizable monomer as one of photocurable components in the photocurable ink composition, the ink composition can be made curable.

The radically polymerizable monomer is a monomer which undergoes a polymerization reaction by the action of radicals generated from a radical polymerization initiator described later to increase the molecular weight.

As the radically polymerizable monomer, either a monofunctional radically polymerizable monomer or a polyfunctional radically polymerizable monomer can be used, either one may be selectively used, or both may be used in combination.

Examples of the monofunctional radically polymerizable monomer (hereinafter, also referred to as a "monofunctional monomer") include N-vinyl compounds such as N-vinyl-F-caprolactam and N-vinylpyrrolidone;

monofunctional acrylate compounds such as 2-phenoxyethyl acrylate (PEA), benzyl acrylate, cyclic trimethylolpropane formal acrylate (CTFA), isobornyl acrylate (IBOA), tetrahydrofurfuryl acrylate, 2-(2-ethoxyethoxy)ethyl acrylate, octyl acrylate, decyl acrylate, tridecyl acrylate, isodecyl acrylate, lauryl acrylate, 3,3,5-trimethylcyclohexyl acrylate, dicyclopentenyl acrylate, 4-t-butylcyclohexyl acrylate, cyclohexyl acrylate, caprolactone-modified acrylate, hydroxyethyl acrylate, hydroxybutyl acrylate, polyethylene glycol acrylate, polypropylene glycol acrylate, nonylphenoxy polyethylene glycol acrylate, and nonylphenoxy polypropylene glycol acrylate;

monofunctional methacrylate compounds such as 2-phenoxyethyl methacrylate, benzyl methacrylate, isobornyl methacrylate, tetrahydrofurfuryl methacrylate, 2-(2-ethoxyethoxy)ethyl methacrylate, octyl methacrylate, decyl methacrylate, tridecyl methacrylate, isodecyl methacrylate, lauryl methacrylate, 3,3,5-trimethylcyclohexyl methacrylate, dicyclopentenyl methacrylate, 4-t-butylcyclohexyl methacrylate, cyclohexyl methacrylate, caprolactone-modified methacrylate, hydroxyethyl methacrylate, hydroxybutyl methacrylate, polyethylene glycol methacrylate, polypropylene glycol methacrylate, nonylphenoxy polyethylene glycol methacrylate, and nonylphenoxy polypropylene glycol methacrylate;

monofunctional vinyl ether compounds such as n-propyl vinyl ether, isopropyl vinyl ether, n-butyl vinyl ether, isobutyl vinyl ether, 2-ethylhexyl vinyl ether, cyclohexyl vinyl ether, 2-hydroxyethyl vinyl ether, 4-hydroxybutyl vinyl ether, and cyclohexanedimethanol monovinyl ether;

acrylamide, N,N-dimethylacrylamide, and N,N-diethylacrylamide;

monofunctional acrylamide compounds such as acryloylmorpholine (ACMO), N-isopropylacrylamide, N-hydroxyethylacrylamide, N-butylacrylamide, N-tertbutylacrylamide, N-(1,1-dimethyl-3-oxobutyl)acrylamide, N-dodecylacrylamide, and N-(butoxymethyl)acrylamide; and monofunctional methacrylamide compounds such as methacrylamide, N-phenylmethacrylamide, N-(methoxymethyl)methacrylamide, N,N-dimethylmethacrylamide, and N-tert-butylmethacrylamide.

Examples of the bifunctional radically polymerizable monomer (hereinafter, also referred to as a "bifunctional monomer") include bifunctional acrylate compounds such as hexadiol diacrylate, dipropylene glycol diacrylate, 3-methyl-1,5-pentanediol diacrylate, polyethylene glycol diacrylate, polypropylene glycol diacrylate, nonanediol diacrylate, decanediol diacrylate, neopentyl glycol diacrylate, polyethylene glycol-modified bisphenol A diacrylate, dioxane glycol diacrylate, cyclohexanedimethanol diacrylate, and tricyclodecanedimethanol diacrylate;

2-(2-vinyloxyethoxy)ethyl acrylate (VEEA);

bifunctional vinyl compounds such as 1,4-butanediol divinyl ether, cyclohexanedimethanol divinyl ether, diethylene glycol divinyl ether, and triethylene glycol divinyl ether (DVE3); and bifunctional methacrylate compounds such as hexanediol dimethacrylate, dipropylene glycol dimethacrylate, polyethylene glycol dimethacrylate, polypropylene glycol dimethacrylate, neopentyl glycol dimethacrylate, and polyethylene glycol-modified bisphenol A dimethacrylate.

Examples of a tri- or higher functional radically polymerizable monomer (hereinafter, also referred to as a "trifunctional monomer") include tri- or higher functional (meth)acrylate compounds such as pentaerythritol triacrylate, pentaerythritol tetraacrylate, dipentaerythritol pentaacrylate, dipentaerythritol hexaacrylate (DPHA), trimethylolpropane triacrylate, ditrimethylolpropane tetraacrylate, pentaerythritol trimethacrylate, and pentaerythritol tetramethacrylate.

In addition to the above-described radically polymerizable monomers, commercially available products described in "Cross-linking Agent Handbook" (1981, edited by Shinzo Yamashita, published by Taiseisha, Ltd.), "UV-EB Curing Handbook (part of raw materials)" (1985, edited by Kiyoshi Kato, published by Kobunshi Kankokai), "Application and Market of UV-EB Curing Technology" (pp. 79, 1989, edited by Rad Tech Japan, CMC Publishing Co., Ltd.), "Polyester Resin Handbook" (1988, written by Eiichiro Takiyama, published by Nikkan Kogyo Shimbun, Ltd.); or a monofunctional or bifunctional radically polymerizable monomer which is known in the field can be used.

The molecular weight of the radically polymerizable monomer is preferably 100 or more and less than 1000, more preferably 100 to 800, and still more preferably 150 to 700.

The radically polymerizable monomer preferably includes a bi- or higher functional radically polymerizable monomer. By including the bi- or higher functional radically polymerizable monomer, the content of the monofunctional radically polymerizable monomer in the ink composition is relatively reduced or eliminated, so that it is possible to suppress phenomenon (so-called migration) in which the monomer component is transferred to the outside from the image after recording. In particular, from the viewpoint of adoption to fields in which safety in the base material is strictly required, such as packaging films for foods or packaging materials for cosmetics, it is preferable to include the bi- or higher functional radically polymerizable monomer.

Further, for the same reason as described above, it is more preferable that the radically polymerizable monomer contains the monofunctional radically polymerizable monomer and at least one monomer selected from the group consisting of a bifunctional radically polymerizable monomer and a trifunctional radically polymerizable monomer.

In particular, as the radically polymerizable monomer, from the viewpoint of food safety, it is preferable to select a monomer listed in the food packaging regulations (EU law, Swiss Ordinance).

In the present disclosure, for the same reason as described above, it is preferable that the radically polymerizable monomer includes the bi- or higher functional radically polymerizable monomer, and the content of the bi- or higher functional radically polymerizable monomer is 50% by mass or more with respect to the total content of the radically polymerizable monomer.

Further, the content of the bi- or higher functional radically polymerizable monomer is more preferably 50% by mass to 90% by mass, still more preferably 60% by mass to 80% by mass, and particularly preferably 60% by mass to 75% by mass with respect to the total content of the radically polymerizable monomer.

The total content of the radically polymerizable monomer in the photocurable ink composition according to the embodiment of the present disclosure is preferably 50% by mass or more with respect to the total amount of the ink.

The case where the total content of the radically polymerizable monomer is 50% by mass or more means that the photocurable ink composition is an ink including the monomer as a main liquid component.

The total content of the radically polymerizable monomer in the photocurable ink composition according to the embodiment of the present disclosure is more preferably 60% by mass or more, still more preferably 70% by mass or more, and particularly preferably 80% by mass or more with respect to the total amount of the photocurable ink composition.

The upper limit of the total content of the radically polymerizable monomer is not particularly limited, but the upper limit can be, for example, 95% by mass with respect to the total amount of the photocurable ink composition.

Radical Polymerization Initiator

The photocurable ink composition according to the embodiment of the present disclosure contains at least one radical polymerization initiator.

By containing the radical polymerization initiator as one of photocurable components in the photocurable ink composition, the ink composition can be made curable.

The radical polymerization initiator is preferably a photopolymerization initiator which generates radicals by irradiation with light and initiates the polymerization reaction of the radically polymerizable monomer described above.

Examples of the radical polymerization initiator include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon halogen bond, and (m) alkylamine compounds.

As the radical polymerization initiator, the above-described compounds (a) to (m) may be used alone or in combination of two or more thereof.

As the radical polymerization initiator, the above-described (a), (b), or (e) is more preferable.

As preferred examples of (a) the carbonyl compound, (b) the acylphosphine oxide compound, and (e) the thio compound, compounds having a benzophenone skeleton or a thioxanthone skeleton described in "RADIATION CURING IN POLYMER SCIENCE AND TECHNOLOGY," J. P. FOUASSIER, J. F. RABEK (1993), pp. 77 to 117 are exemplified.

More preferred examples thereof include an a-thiobenzophenone compound described in JP1972-6416B (JP-S47-6416B), a benzoin ether compound described in JP1972-3981B (JP-S47-3981B), an a-substituted benzoin compound described in JP1972-22326B (JP-S47-22326B), a benzoin derivative described in JP1972-23664B (JP-S47-23664B), aroyl phosphonate ester described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JP-S62-81345A), a-aminobenzophenones described in JP1989-34242B (JP-H01-34242B), U.S. Pat. No. 4,318,791A pamphlet, and EP0284561A1, p-di(dimethylaminobenzoyl)benzene described in JP1990-211452A (JP-H02-211452A), thio-substituted aromatic ketone described in JP1986-194062A (JP-S61-194062A), acyl phosphine sulfide described in JP1990-9597B (JP-H02-9597B), acyl phosphine described in JP1990-9596B (JP-H02-9596B), thioxanthones described in JP1988-61950B (JP-S63-61950B), and coumarins described in JP1984-42864B (JP-S59-42864B).

In addition, polymerization initiators described in JP2008-105379A and JP2009-114290A are also preferable.

Among the photopolymerization initiators, (a) the carbonyl compound or (b) the acylphosphine oxide compound is more preferable, and specific examples thereof include bis(2,4,6-trimethylbenzoyl)-phenylphosphine oxide (for example, IRGACURE (registered trademark) 819, manufactured by BASF), 2-(dimethylamine)-1-(4-morpholinophenyl)-2-benzyl-1-butanone (for example, IRGACURE (registered trademark) 369, manufactured by BASF), 2-methyl-1-(4-methylthiophenyl)-2-morpholinopropan-1-one (for example, IRGACURE (registered trademark) 907, manufactured by BASF), 1-hydroxy-cyclohexyl-phenyl-ketone (for example, IRGACURE (registered trademark) 184, manufactured by BASF), and 2,4,6-trimethylbenzoyl-diphenyl-phosphine oxide (for example, DAROCUR (registered trademark) TPO and LUCIRIN (registered trademark) TPO (both manufactured by BASF)).

Among these, from the viewpoint of improving sensitivity and compatibility with LED light, as the photopolymerization initiator, (b) the acylphosphine oxide compound is preferable, and a monoacylphosphine oxide compound (particularly preferably, 2,4,6-trimethylbenzoyl-diphenyl-phosphine oxide) or a bisacylphosphine oxide compound (particularly preferably, bis(2,4,6-trimethylbenzoyl)-phenylphosphine oxide) is more preferable.

The content of the photopolymerization initiator in the photocurable ink composition is preferably 1.0% by mass to 25.0% by mass, more preferably 2.0% by mass to 20.0% by mass, and still more preferably 3.0% by mass to 15.0% by mass with respect to the total amount of the photocurable ink composition.

Coloring Agent Sensitizer

The photocurable ink composition according to the embodiment of the present disclosure contains at least one coloring agent sensitizer.

By containing the coloring agent sensitizer in the photocurable ink composition, photocuring properties can be enhanced, and in particular, photocuring properties in a case where an LED light source is used can be improved. In addition, the coloring agent sensitizer also contributes to improvement of light resistance.

The coloring agent sensitizer is a substance which absorbs specific active energy rays and enters an electronically-excited state. A coloring agent sensitizer which has entered in an electronically-excited state is brought into contact with the radical polymerization initiator and causes actions of electron migration, energy transfer, heat generation, and the like. In this manner, chemical change in the radical polymerization initiator, that is, decomposition, or generation of radicals, acid, base is promoted.

Examples of the coloring agent sensitizer include ethyl 4-(dimethylamino)benzoate (EDB), anthraquinone, a 3-acyl coumarin derivative, terphenyl, styryl ketone, 3-(aroylmethylene)thiazoline, succinoquinone, eosin, rhodamine, erythrosine, a compound represented by General Formula (i) described in JP2010-24276A, and a compound represented by General Formula (I) described in JP1994-107718A (JP-H06-107718A).

In a case where the photocurable ink composition is used in the food packaging field, it is necessary to ensure food safety and sufficient curing properties. Therefore, among the coloring agent sensitizers, from the viewpoint of food safety, and from the viewpoint of ensuring better curing properties in consideration of compatibility with LED light and reactivity with photopolymerization initiator, it is preferable to include at least one of a thioxanthone-based compound or a thiochromanon-based compound.

With regard to the thioxanthone compound and the thiochromanone compound, paragraphs 0066 to 0077 of JP2012-46724A may be referred to.

Thioxanthone Compound

As the thioxanthone compound, a compound represented by Formula (3) is preferable.

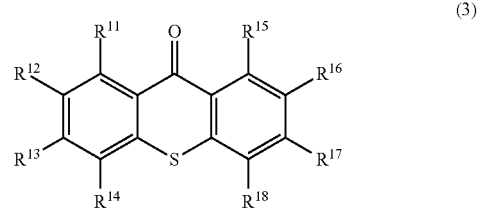

(3)

In Formula (3), $R^{11}$ to $R^{18}$ each independently represent a hydrogen atom, an alkyl group, a halogen atom, a hydroxy group, a cyano group, a nitro group, an amino group, an alkylthio group, an alkylamino group (including mono-substituted and di-substituted), an alkoxy group, an alkoxycarbonyl group, an acyloxy group, an acyl group, a carboxy group, or a sulfo group.

The number of carbon atoms in an alkyl portion of each of the above-described alkyl group, alkylthio group, alkylamino group, alkoxy group, alkoxycarbonyl group, acyloxy group, and acyl group is preferably 1 to 20, more preferably 1 to 8, and still more preferably 1 to 4.

The above-described acyloxy group may be an aryloxycarbonyl group, and the above-described acyl group may be an arylcarbonyl group. In this case, the number of carbon atoms in an aryl portion of each of the arylcarbonyl group and the aryloxycarbonyl group is preferably 6 to 14 and more preferably 6 to 10.

Two adjacent pieces in $R^{11}$ to $R^{18}$ may be linked to each other to form a ring structure.

Examples of the ring structure include a 5-membered or 6-membered monocyclic structure, and a binuclear ring (for example, a fused ring) in which two 5-membered or 6-membered monocyclic structures are combined.

Examples of the 5-membered or 6-membered monocyclic structure include an aliphatic ring, an aromatic ring, and a hetero ring. Examples of a heteroatom in the hetero ring include N, O, and S. Examples of the combination of monocyclic rings in the binuclear ring include a combination of an aliphatic ring and an aliphatic ring, a combination of an aliphatic ring and an aromatic ring, a combination of an aliphatic ring and a hetero ring, a combination of an aromatic ring and an aromatic ring, a combination of an aromatic ring and a hetero ring, and a combination of a hetero ring and a hetero ring.

The ring structure may have a substituent. Examples of the substituent include an alkyl group, an alkyl halide group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group.

As the halogen atom, a fluorine atom, a chlorine atom, a bromine atom, or an iodine atom is preferable, a chlorine atom, a bromine atom, or an iodine atom is more preferable, and a chlorine atom or a bromine atom is still more preferable.

As the alkyl halide group, an alkyl fluoride group is preferable.

Examples of the thioxanthone compound include thioxanthone, 2-isopropylthioxanthone, 4-isopropylthioxanthone, 2-chlorothioxanthone, 2,4-dichlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboxyimide, n-octylthioxanthone-3,4-dicarboxyimide, N-(1,1,3,3-tetramethylbutyl)thioxanthone-3,4-dicarboxyimide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthone-2-yloxy)-N,N,N-trimethyl-1-propaneamini um chloride.

Among these, from the viewpoint of availability and curing properties, 2,4-diethylthioxanthone, 2-isopropylthioxanthone, or 4-isopropylthioxanthone is preferable.

As the thioxanthone compound, a commercially available product on the market may be used. Examples of the commercially available product include SPEEDCURE series (for example, SPEEDCURE 7010, SPEEDCURE CPTX, SPEEDCURE ITX, and the like) manufactured by Lambson.

Thiochromanone Compound

As the thiochromanone compound, a compound represented by Formula (4) is preferable.

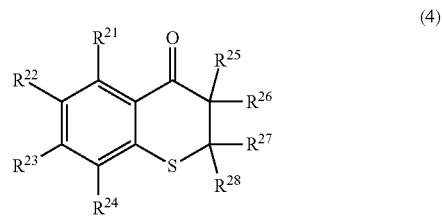

(4)

$R^{21}$ to $R^{28}$ in Formula (4) are synonymous with $R^{11}$ to $R^{18}$ in Formula (3), respectively, and preferred aspects are also the same.

Two adjacent pieces in $R^2$ to $R^{24}$ of Formula (4) may be linked to each other to form a ring structure.

Examples of the ring structure in which two adjacent pieces in $R^{21}$ to $R^{24}$ of Formula (4) can form a ring are the same as the example of the ring structure in which two adjacent pieces in $R^{11}$ to $R^{18}$ of Formula (3) can form a ring.

The thiochromanone compound may have at least one substituent (for example, an alkyl group, an alkyl halide group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group) on the ring structure of thiochromanone.

As the above-described substituent, an alkyl group, a halogen atom, a hydroxy group, an alkylthio group, an alkylamino group, an alkoxy group, or an acyloxy group is preferable, an alkyl group having 1 to 20 carbon atoms or a halogen atom is more preferable, and an alkyl group having 1 to 4 carbon atoms or a halogen atom is still more preferable.

As the halogen atom, a fluorine atom, a chlorine atom, a bromine atom, or an iodine atom is preferable, a chlorine atom, a bromine atom, or an iodine atom is more preferable, and a chlorine atom or a bromine atom is still more preferable.

As the alkyl halide group, an alkyl fluoride group is preferable.

In addition, it is more preferable that the thiochromanone compound is a compound having at least one substituent on each of the aromatic ring and the cyclohexanone ring.

Specific examples of the thiochromanone compound include the following (2-1) to (2-30). Among these, (2-14), (2-17), or (2-19) is more preferable, and (2-14) is still more preferable.

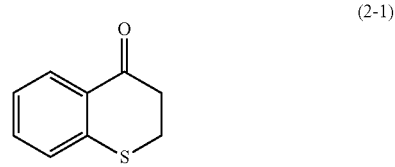

(2-1)

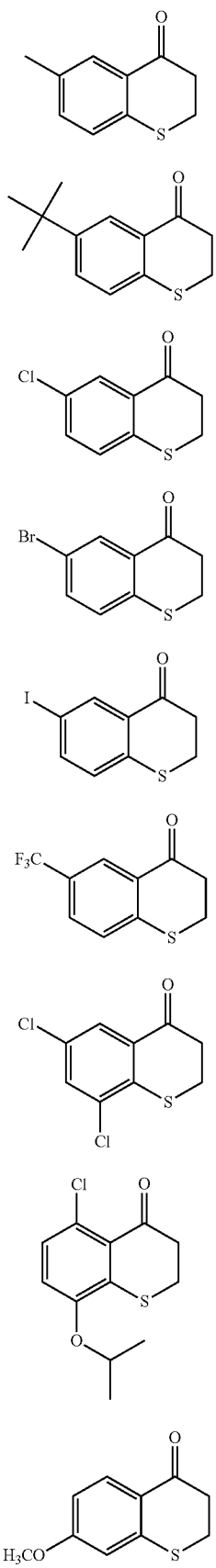
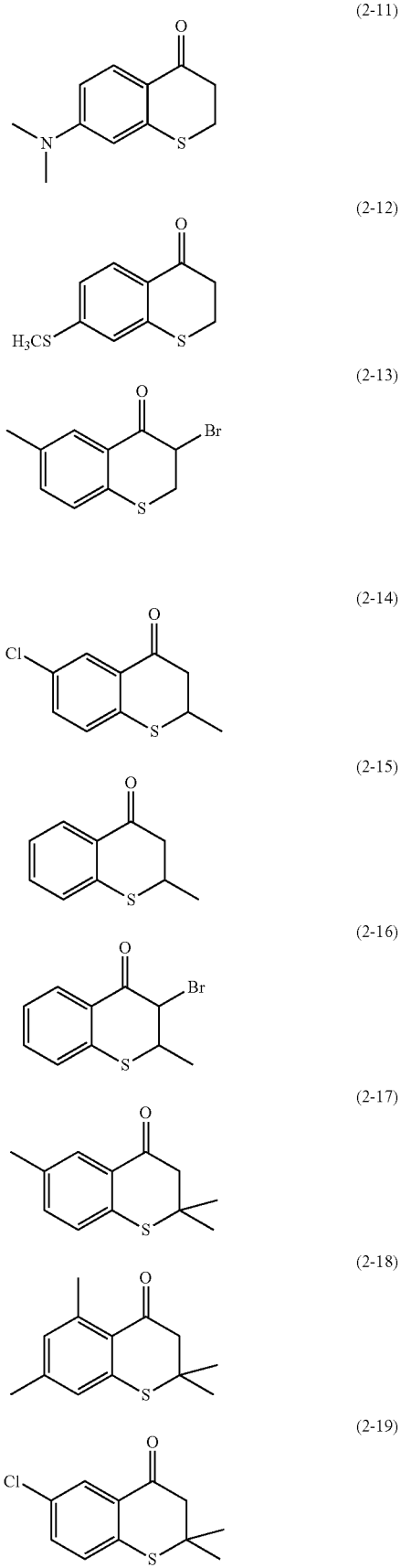

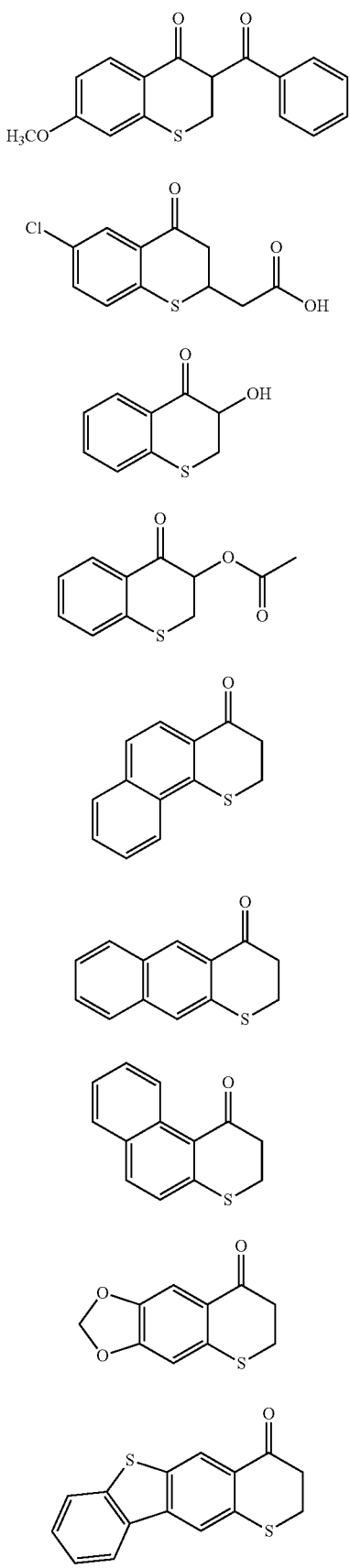

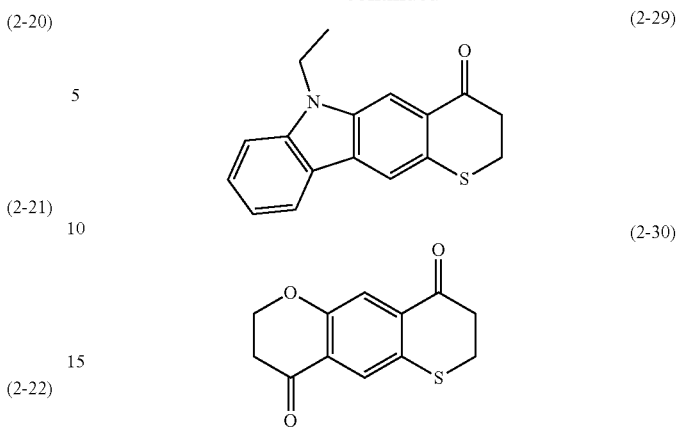

At least one of the coloring agent sensitizer preferably has a molecular weight of 1000 or more.

In a case where at least one of the coloring agent sensitizer preferably has a molecular weight of 1000 or more, it is possible to suppress phenomenon (so-called migration) in which the monomer component is transferred to the outside from the image after recording. In particular, from the viewpoint of adoption to food packaging field and cosmetic packaging field, in which safety in the base material is strictly required, such as packaging films for foods or packaging materials for cosmetics, it is preferable that at least one of the coloring agent sensitizer preferably has a molecular weight of 1000 or more.

Among these, it is preferable to contain a thioxanthone-based compound having a molecular weight of 1000 or more or a thiochromanon-based compound having a molecular weight of 1000 or more.

The molecular weight of the coloring agent sensitizer is more preferably in a range of 1000 to 100000 and still more preferably in a range of 1000 to 50000.

The ratio (coloring agent sensitizer/squarylium coloring agent) of the content of the coloring agent sensitizer to the content of the squarylium coloring agent is preferably 1 to 20 and more preferably 1 to 10 on a mass basis.

The content of the coloring agent sensitizer in the photocurable ink composition is preferably 1.0% by mass to 15.0% by mass, more preferably 1.5% by mass to 10.0% by mass, and still more preferably 2.0% by mass to 6.0% by mass with respect to the total amount of the photocurable ink composition.

Other Components

The photocurable ink composition according to the embodiment of the present disclosure may further contain the following other components, in addition to the above-described components.

—Surfactant—

The photocurable ink composition according to the embodiment of the present disclosure may contain a surfactant. Examples of the surfactant include surfactants described in JP1987-173463A (JP-S62-173463A) and JP1987-183457A (JP-S62-183457A). Examples thereof include anionic surfactants such as dialkyl sulfosuccinate, alkyl naphthalene sulfonate, and fatty acid salts; nonionic surfactants such as polyoxyethylene alkyl ether, polyoxyethylene alkyl allyl ether, acetylene glycol, a polyoxyethylenepolyoxypropylene block copolymer and siloxanes such as modified polydimethylsiloxane (for example, BYK-307 and the like manufactured by BYK Chemie); cationic surfactants such as alkylamine salts and quaternary ammonium salts; and betaine-based surfactants such as carbobetaine and sulfobetaine.

An organic fluoro compound may be used instead of the surfactant. It is preferable that the organic fluoro compound is hydrophobic. Examples of the organic fluoro compound include a fluorine-containing surfactant, an oily fluorine-containing compound (for example, fluorine oil), a solid-like fluorine compound resin (for example, a tetrafluoroethylene resin), and compounds described in JP1982-9053B (JP-S57-9053B) (sections 8 to 17) and JP1987-135826B (JP-S62-135826B).

In a case where the photocurable ink composition according to the embodiment of the present disclosure contains a surfactant, the content of the surfactant is preferably 0.01% by mass to 5% by mass, more preferably 0.05% by mass to 3% by mass, and still more preferably 0.05% by mass to 1.5% by mass with respect to the total amount of the photocurable ink composition.

Polymerization Inhibitor

The photocurable ink composition according to the embodiment of the present disclosure may contain a polymerization inhibitor.

Examples of the polymerization inhibitor include p-methoxyphenol, quinones (for example, hydroquinone, benzoquinone, and methoxybenzoquinone), phenothiazine, catechols, alkylphenols (for example, dibutyl hydroxy toluene (BHT)), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), and tris(N-nitroso-N-phenylhydroxylamine)aluminum salt (also known as Cupferron Al).

Among these, as the polymerization inhibitor, at least one selected from p-methoxyphenol, catechols, quinones, alkylphenols, TEMPO, TEMPOL, and tris(N-nitroso-N-phenylhydroxylamine)aluminum salt is preferable, and at least one selected from p-methoxyphenol, hydroquinone, benzoquinone, BHT, TEMPO, TEMPOL, and tris(N-nitroso-N-phenylhydroxylamine)aluminum salt is more preferable.

In a case where the photocurable ink composition according to the embodiment of the present disclosure contains a polymerization inhibitor, the content of the polymerization inhibitor is preferably 0.01% by mass to 2.0% by mass with respect to the total amount of the photocurable ink composition.

Organic Solvent

The photocurable ink composition according to the embodiment of the present disclosure may contain an organic solvent.

Examples of the organic solvent include ketones such as acetone, methyl ethyl ketone, and diethyl ketone; alcohols such as methanol, ethanol, 2-propanol, 1-propanol, 1-butanol, and tert-butanol;
chlorine solvents such as chloroform and methylene chloride; aromatic solvents such as benzene and toluene; ester solvents such as ethyl acetate, butyl acetate, isopropyl acetate, ethyl lactate, butyl lactate, and isopropyl lactate; ether solvents such as diethyl ether, tetrahydrofuran, and dioxane; glycol ether solvents such as ethylene glycol monomethyl ether, ethylene glycol dimethyl ether, and propylene glycol monomethyl ether; and glycol ether acetate solvents such as propylene glycol monomethyl ether acetate.

In a case where the photocurable ink composition contains an organic solvent, the content of the organic solvent is preferably 1% by mass or less, more preferably 0.5% by mass or less, and still more preferably 0.1% by mass or less with respect to the total amount of the photocurable ink composition. The photocurable ink composition may have composition in which the organic solvent is not included (that is, the content of the organic solvent is 0% by mass with respect to the total amount of the photocurable ink composition).

Resin

The photocurable ink composition according to the embodiment of the present disclosure may contain at least one resin.

Examples of the resin include an epoxy resin, a vinyl chloride resin, a vinyl acetate resin, polyester, (meth)acrylic resin (for example, a copolymer of methyl methacrylate and n-butyl methacrylate), chlorinated polyolefin, and polyketone.

The weight-average molecular weight (Mw) of the resin is preferably 3,000 to 200,000, more preferably 5,000 to 200,000, and still more preferably 10,000 to 150,000.

In a case where the photocurable ink composition contains a resin, the content of the resin is preferably 1% by mass to 10% by mass with respect to the total amount of the photocurable ink composition.

Water

The photocurable ink composition according to the embodiment of the present disclosure may contain a small amount of water.

Specifically, the content of water is preferably 3% by mass or less, more preferably 2% by mass or less, and particularly preferably 1% by mass or less with respect to the total amount of the photocurable ink composition according to the embodiment of the present disclosure. The photocurable ink composition according to the embodiment of the present disclosure is preferably a non-aqueous photocurable ink composition which does not substantially contain water.

Other Components

The photocurable ink composition according to the embodiment of the present disclosure may contain other components other than the above.

Examples of the other components include an ultraviolet absorber, a co-sensitizer, an antioxidant, a fading inhibitor, and a conductive salt. With regard to the other components, reference can be appropriately made to known documents, for example, JP2011-225848A, JP2009-209352A, and the like.

Physical Properties of Photocurable Ink Composition

The viscosity of the photocurable ink composition according to the embodiment of the present disclosure is not particularly limited.

The viscosity of the photocurable ink composition according to the embodiment of the present disclosure at 25° C. is preferably in a range of 10 mPa-s to 50 mPa-s, more preferably in a range of 10 mPa-s to 30 mPa-s, and still more preferably in a range of 10 mPa-s to 25 mPa-s. The viscosity of the ink can be adjusted by, for example, adjusting the compositional ratios of respective components to be contained.

The viscosity is a value measured using a viscometer "VISCOMETER RE-85L" (manufactured by TOKI SANGYO CO., LTD.).

In a case where the viscosity of the ink is within the above-described range, the jetting stability can be further improved.

The surface tension of the photocurable ink composition according to the embodiment of the present disclosure is not particularly limited.

The surface tension of the photocurable ink composition according to the embodiment of the present disclosure at 30° C. is preferably in a range of 20 mN/m to 30 mN/m and more preferably in a range of 23 mN/m to 28 mN/m. The surface tension is preferably 30 mN/m or less in terms of wettability, and the surface tension is preferably 20 mN/m or more in terms of bleeding suppression and permeability.

The surface tension is a value measured using a surface tensiometer DY-700 (manufactured by Kyowa Interface Science Co., Ltd.).

Image Recording Method

In the image recording method according to the embodiment of the present disclosure, the above-described photocurable ink composition according to the embodiment of the present disclosure is used.

Since the photocurable ink composition according to the embodiment of the present disclosure is used, it is possible to record an image which has invisibility, has excellent IR absorption ability, and has more excellent light resistance compared with that of the related art.

The photocurable ink composition according to the embodiment of the present disclosure can be used for recording an image by appropriately selecting a method depending on the purpose or the case. As the image recording method, a method (image recording method according to the embodiment of the present disclosure) which includes a step (hereinafter, also referred to as an "ink applying step") of applying the photocurable ink composition to a base material and a step (hereinafter, also referred to as a "light irradiating step") of irradiating the photocurable ink composition applied to the base material with light by a light emitting diode to record an infrared absorbing image is preferable.

Ink Applying Step

In the ink applying step of the present disclosure, the photocurable ink composition is applied to the base material.

In the ink applying step, it is preferable to apply the photocurable ink composition to the base material according to an ink jet method. In this step, an ink film is formed on the base material.

Application of the ink according to the ink jet method can be performed using a known ink jet recording device.

The ink jet recording device is not particularly limited, and a known ink jet recording device which can achieve the target resolution can be optionally selected and used.

Examples of the ink jet recording device include devices including an ink supply system, a temperature sensor, and a heating unit.

The ink supply system consists of an original tank including an ink, a supply pipe, an ink supply tank in just front of an ink jet head, a filter, and a piezoelectric ink jet head. The piezoelectric ink jet head can drive multi-size dots of preferably in a range of 1 pL to 100 pL and more preferably in a range of 8 pL to 30 pL to be jetted with the resolution of preferably in a range of 320 dpi (dot per inch)×320 dpi to 4000 dpi×4000 dpi, more preferably in a range of 400 dpi×400 dpi to 1600 dpi×1600 dpi, and still more preferably in a range of 720 dpi×720 dpi to 1600 dpi×1600 dpi. In addition, "dpi" indicates the number of dots per 2.54 cm (1 inch).

As a shape of the base material, a plate shape is preferable.

As the base material, a semiconductor substrate such as a silicon substrate, a glass substrate, or a plastic substrate can be used.

As the base material, a base material provided with a wiring line, a transistor, a diode, light-receiving elements, a sensor, or an actuator in advance may be used.

Examples of a plastic in the plastic substrate include polyethylene terephthalate (PET), polyethylene naphthalate (PEN), polycarbonate (PC), triacetyl cellulose (TAC), polyimide (PI), polybenzoxazole (PBO), and cycloolefin polymer (COP).

A gas barrier layer and/or a solvent resistant layer may be provided on a surface of the plastic substrate.

Light Irradiating Step

In the light irradiating step of the present disclosure, the photocurable ink composition applied to the base material is irradiated with light by a light emitting diode (LED) to record an infrared absorbing image.

Examples of the light (LED light) emitted by the LED include ultraviolet (UV) light and visible light, and UV light is preferable.

Although it depends on absorption characteristics of the radical polymerization initiator and the coloring agent sensitizer, the peak wavelength of the LED light is preferably 200 nm to 600 nm, more preferably 300 nm to 450 nm, still more preferably 320 nm to 420 nm, and particularly preferably ultraviolet rays having a peak wavelength of 340 nm to 400 nm. As the LED, an ultraviolet LED can be used, and examples thereof include a violet LED manufactured by NICHIA CORPORATION, which has a main emission spectrum of between 365 nm and 420 nm. In addition, examples thereof also include an LED described in U.S. Pat. No. 6,084,250B, which can emit radioactive ray centered between 300 nm and 370 nm. In the present disclosure, a particularly preferred radioactive ray source is a UV-LED, and it is particularly preferable to be a UV-LED having a peak wavelength in a wavelength range of 340 nm to 400 nm. For example, an LED having a peak wavelength of 355 nm, 365 nm, 385 nm, 395 nm, or 405 nm is more preferable.

The maximum illuminance of the LED on the base material is preferably 10 mW/cm$^2$ to 2,000 mW/cm$^2$, more preferably 20 mW/cm$^2$ to 1,000 mW/cm$^2$, and still more preferably 50 mW/cm$^2$ to 800 mW/cm$^2$.

EXAMPLES

Hereinafter, the photocurable ink composition according to the embodiment of the present disclosure and the image recording method using the same will be described in more detail with reference to Examples. However, the present disclosure is not limited to Examples described below as long as it is within the gist of the present disclosure.

Example 1

Preparation of Ink Jet Ink Composition A1

Preparation of Dispersion A1

Components in the following composition were mixed and dispersed in a beads mill for 3 hours to obtain a dispersion A1.
<Composition>
Squarylium coloring agent (SQ coloring agent) B-1 . . . 2 parts
(specific example of the squarylium coloring agent represented by Formula (1) described above)
S32000 . . . 0.8 parts
(Solsperse 32000, manufactured by Lubrizol Corporation; dispersant having no aromatic group)
Monomer A . . . 20 parts
(4-HBA: hydroxybutyl acrylate, manufactured by OSAKA ORGANIC CHEMICAL INDUSTRY LTD.; monofunctional radically polymerizable monomer)
Monomer B . . . 16.8 parts
(Viscoat #200 (cyclic trimethylolpropane formal acrylate), manufactured by OSAKA ORGANIC CHEMICAL INDUSTRY LTD.; monofunctional radically polymerizable monomer)
Monomer E . . . 60.4 parts
(SR341 (3-methyl-1,5-pentanediol diacrylate), manufactured by Sartomer; polyfunctional radically polymerizable monomer)
—Preparation of Ink Jet Ink Composition A1—
Next, Components in the following composition were mixed and stirred to prepare an ink jet ink composition A1.
<Composition>
Dispersion A1 described above . . . 50 parts
Monomer A . . . 10 parts
(4-HBA: hydroxybutyl acrylate, manufactured by OSAKA ORGANIC CHEMICAL INDUSTRY LTD.; monofunctional radically polymerizable monomer)
Monomer E . . . 29.8 parts
(SR341 (3-methyl-1,5-pentanediol diacrylate), manufactured by Sartomer; polyfunctional radically polymerizable monomer)
Initiator A . . . 6 parts
(IRGACURE (registered trademark) 819 (manufactured by BASF; acylphosphine oxide compound; radical polymerization initiator)
Sensitizer A (coloring agent sensitizer) . . . 4 parts
(SPEEDCURE 7010L, manufactured by Lambson, molecular weight: 1000 to 2000; thioxanthone-based compound)
UV12 . . . 0.1 parts
(FLORSTAB UV12, (tris(N-nitroso-N-phenylhydroxylamine) aluminum salt), manufactured by Kromachem Ltd.; nitroso-based polymerization inhibitor)
Surfactant (BYK307, manufactured by BYK Chemie Japan) . . . 0.1 parts Examples 2 to 22

Dispersions were prepared in the same manner as in Example 1, except that the composition in Example 1 was modified as shown in Tables 1 and 2, and ink jet ink compositions were further prepared.
Details of the components in Tables 1 to 3 are as follows.
Monomer C: SR339A (2-phenoxyethyl acrylate), manufactured by Sartomer (monofunctional radically polymerizable monomer)
Monomer D: SR506A (isobornyl acrylate), manufactured by Sartomer (monofunctional radically polymerizable monomer)
Monomer F: DVE-3 (triethylene glycol divinyl ether), manufactured by BASF (polyfunctional radically polymerizable monomer)
Monomer G: SR508 (dipropylene glycol diacrylate), manufactured by Sartomer (polyfunctional radically polymerizable monomer)
Initiator B: IRGACURE (registered trademark) 184, manufactured by BASF (radical polymerization initiator)
Initiator C: DAROCURE TPO, manufactured by BASF (radical polymerization initiator)
Sensitizer B (coloring agent sensitizer): 2-isopropylthioxanthone, molecular weight: 254 (thioxanthone-based compound)
Sensitizer C (coloring agent sensitizer): 6-chloro-2-methyl(thiochromanone), molecular weight: 213 (thiochromanon-based compound)

Comparative Examples 1 to 3

Dispersions were prepared in the same manner as in Example 1, except that the composition in Example 1 was modified as shown in Table 3, and ink jet ink compositions were further prepared.

Comparative Examples 4 to 6

Dispersions were prepared in the same manner as in Example 1, except that the squarylium coloring agent in the composition of Example 1 was replaced with the following coloring agents (Cyanine 1, Cyanine 2, and Diimmonium), and ink jet ink compositions were prepared.

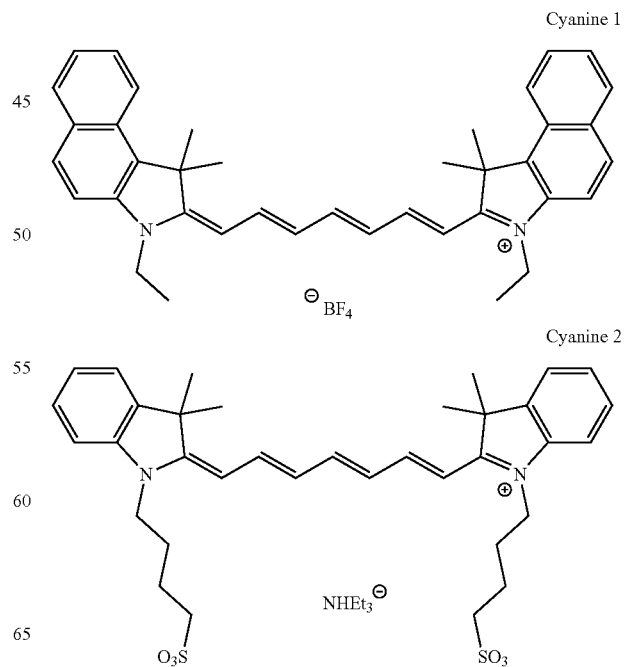

-continued

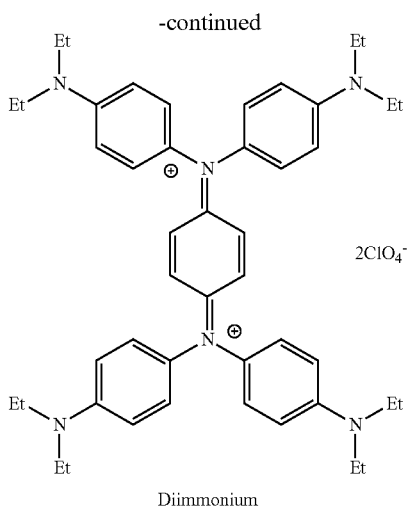

Diimmonium

Image Recording and Evaluation

Each of the ink jet ink compositions prepared in Examples and Comparative Examples was filled in an ink cartridge attached to an ink jet recording device (FUJIFILM DMP-2831), and a 100% halftone dot image was recorded on coated paper (OK topcoat, manufactured by Oji Paper Co., Ltd.) under the conditions of 600 dpi (dots per inch) and 10 pl (picoliter)/dot. Thereafter, using an experimental 385 nm UV-LED irradiator (manufactured by CCS Inc.) as an exposure device, irradiation was performed under an exposure condition of an exposure energy of 1000 mJ/cm$^2$ and cured to obtain an infrared absorbing image.

The following evaluations were performed on each ink jet ink composition prepared in Examples and Comparative Examples and the above-described infrared absorbing image. The evaluation results are shown in Tables 1 to 3.

Evaluation 1: Jettability

The ink jet ink composition A1 was filled in an ink cartridge attached to an ink jet recording device (FUJIFILM DMP-2831), an ink jetting part of an ink jet head was observed at all nozzles, and jettability of the ink was evaluated according to the following evaluation standard.

The proportion (%) of the number of non-jetting nozzles means a proportion of the number of non-jetting nozzles to the total number of nozzles after continuous ejection for 10 minutes.

As the evaluation, A or B is acceptable, and A is preferable.

Evaluation Standard

A: proportion of the number of non-jetting nozzles was less than 13%.
B: proportion of the number of non-jetting nozzles was 13% or more and less than 32%.
C: proportion of the number of non-jetting nozzles was 32% or more and less than 50%.
D: proportion of the number of non-jetting nozzles was 50% or more.

Evaluation 2: Exposure Resistance

Using the ink jet recording device used to evaluate the jettability, and a 100% halftone dot image was formed on coated paper (OK topcoat, manufactured by Oji Paper Co., Ltd.) under the conditions of 600 dpi (dots per inch) and 10 pl (picoliter) per dot. Thereafter, using an exposure tester equipped with a metal halide lamp (ozoneless metal halide lamp MAN250L), irradiation was performed with ultraviolet (UV) light at an exposure intensity of 2.0 W/cm$^2$. The shape and intensity of the reflection spectrum in the halftone dot image before and after irradiation with UV light were measured by a spectrophotometer (UV-3100PC equipped with a 150 mmφ large integrating sphere accessory device LISR-3100, manufactured by Shimadzu Corporation), and exposure resistance was evaluated according to the following evaluation standard.

The exposure resistance evaluates IR absorption ability after photocuring using the shape and intensity of the reflection spectrum as an indicator. As the evaluation, A or B is practically acceptable, and A is preferable.

Evaluation Standard

A: no change was observed in the shape and intensity of the reflection spectrum before and after irradiation with UV light.
B: small change was observed in the shape and intensity of the reflection spectrum before and after irradiation with UV light.
C: significant change was observed in the shape and intensity of the reflection spectrum before and after irradiation with UV light.

Evaluation 3: Light Resistance

Using the halftone dot image formed by the same method as the evaluation of the exposure resistance, light resistance was evaluated.

Specifically, after irradiating the halftone dot image with xenon light (85,000 lx) using a weather meter (Atlas C.I65) for 6 days, optical density of the halftone dot image before and after irradiation with xenon light at the maximal absorption wavelength was measured, and coloring agent residual rate was calculated from the following expression and used as an indicator for evaluating the light resistance.

Coloring agent residual rate (%)=(Optical density after irradiation)/(Optical density before irradiation)×100

All optical densities were measured using a spectrophotometer UV-3100PC (manufactured by Shimadzu Corporation) equipped with a 150 mmφ large integrating sphere accessory device LISR-3100.

As the evaluation, A, B, or C is practically acceptable, and A or B is preferable and A is more preferable.

Evaluation Standard

A: coloring agent residual rate was 90% or more.
B: coloring agent residual rate was 75% or more and less than 90%.
C: coloring agent residual rate was 60% or more and less than 75%.
D: coloring agent residual rate was less than 60%.

Evaluation 4: Migration Property

Using the ink jet recording device used in the evaluations 1 to 3, and a 5% halftone dot image (cord pattern) was recorded on a polyethylene film (thickness: 25 m) under the conditions of 600 dpi (dots per inch) and 10 pl (picoliter) per dot, and exposed with an exposure tester. The obtained recorded material was cut into a size of 0.01 m², and 10 mL of a water-ethanol mixed solution (water:ethanol=70:30) in which water and ethanol were mixed was added dropwise to the recording surface. The recorded material after dropwise addition was placed in a glass airtight container so that the water-ethanol mixed solution did not volatilize, and left at 40° C. for 10 days. After 10 days, the total elution amount (overall migration amount: OML) from the recorded material contained in the water-ethanol mixed solution was measured and evaluated according to the following evaluation standard.

The total elution amount was measured by volatilizing the water-ethanol mixed solution after leaving the recorded material for 10 days and measuring the mass of the residual component.

Evaluation Standard

A: elution amount was below the detection limit.

B: elution amount exceeded the detection limit and is 10 ppb or less.

C: elution amount was more than 10 ppb and 50 ppb or less.

D: elution amount was more than 50 ppb and 100 ppb or less.

E: elution amount was more than 100 ppb and 2000 ppb or less.

F: elution amount was more than 2000 ppb.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Coloring agent [part] | B-1 | | 1 | — | — | — | — | — | — | — | — | — | — |
| | B-37 | | — | 1 | — | — | — | — | — | — | — | — | — |
| | B-4 | | — | — | 1 | — | — | — | — | — | — | — | — |
| | B-6 | | — | — | — | 1 | — | — | — | — | — | — | — |
| | B-9 | | — | — | — | — | 1 | — | — | — | — | — | — |
| | B-11 | | — | — | — | — | — | 1 | — | — | — | — | — |
| | B-3 | | — | — | — | — | — | — | 1 | 1 | 0.5 | 0.1 | 5 |
| | B-21 | | — | — | — | — | — | — | — | — | — | — | — |
| | B-24 | | — | — | — | — | — | — | — | — | — | — | — |
| | B-30 | | — | — | — | — | — | — | — | — | — | — | — |
| | B-31 | | — | — | — | — | — | — | — | — | — | — | — |
| | B-38 | | — | — | — | — | — | — | — | — | — | — | — |
| | Cyanine 1 | | — | — | — | — | — | — | — | — | — | — | — |
| | Cyanine 2 | | — | — | — | — | — | — | — | — | — | — | — |
| | Diimmonium | | — | — | — | — | — | — | — | — | — | — | — |
| Dispersant S32000 [part] | | | 0.4 | 0.4 | 0.4 | 0.4 | 0.4 | 0.4 | 0.4 | 0.2 | 0.2 | 0 | 2 |
| Volume average particle diameter of coloring agent [nm] | | | 143 | 128 | 184 | 95 | 112 | 137 | 103 | 248 | 145 | 98 | 45 |
| Radically polymerizable monomer [part] | Monofunctional | Monomer A | 20 | 20 | 20 | 20 | 20 | 20 | 20 | — | — | — | — |
| | | Monomer B | 8.4 | 8.4 | 8.4 | 8.4 | 8.4 | 8.4 | 8.4 | 8.8 | 14 | 15 | 13 |
| | | Monomer C | — | — | — | — | — | — | — | 25 | 20 | 20 | — |
| | | Monomer D | — | — | — | — | — | — | — | — | — | — | 25 |
| | Polyfunctional | Monomer E | 60 | 60 | 60 | 60 | 60 | 60 | 60 | — | — | — | — |
| | | Monomer F | — | — | — | — | — | — | — | 55 | 55 | 55 | — |
| | | Monomer G | — | — | — | — | — | — | — | — | — | — | 50 |
| Total amount ratio of polyfunctional/monomer [%] | | | 67.9 | 67.9 | 67.9 | 67.9 | 67.9 | 67.9 | 67.9 | 62.1 | 61.9 | 61.5 | 56.9 |
| Radical polymerization initiator [part] | Initiator A | | 6 | 6 | 6 | 6 | 6 | 6 | 6 | — | — | — | 4 |
| | Initiator B | | — | — | — | — | — | — | — | 4.8 | 4.8 | 4.8 | 1 |
| | Initiator C | | — | — | — | — | — | — | — | 1.2 | 1.4 | 1.4 | 1 |
| Coloring agent sensitizer [part] | Sensitizer A | | 4 | 4 | 4 | 4 | 4 | 4 | 4 | — | — | — | — |
| | Sensitizer B | | — | — | — | — | — | — | — | 4 | 4 | 4 | — |
| | Sensitizer C | | — | — | — | — | — | — | — | — | — | — | 4 |
| Ratio of coloring agent sensitizer/coloring agent | | | 4 | 4 | 4 | 4 | 4 | 4 | 4 | 4 | 8 | 40 | 0.8 |
| Polymerization inhibitor UV12 [part] | | | 0.1 | 0.1 | 0.1 | 0.1 | 0.1 | 0.1 | 0.1 | 0.1 | 0.1 | 0.1 | 0.1 |
| Surfactant BYK307 [part] | | | 0.1 | 0.1 | 0.1 | 0.1 | 0.3 | 0.1 | 0.1 | 0.1 | 0.1 | 0.1 | 0.1 |
| Evaluation | Jettability | | A | A | A | A | A | A | A | B | A | A | A |
| | Exposure resistance | | A | A | A | A | A | A | A | A | A | A | A |
| | Light resistance | | A | A | A | A | A | A | A | A | A | B | A |
| | Migration property | | A | A | A | A | A | A | A | B | B | B | B |

TABLE 2

|  |  | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| Coloring agent [part] | B-1 | — | — | — | — | — | — | — | 0.5 | — | 0.4 | 0.2 |
|  | B-37 | — | — | — | — | — | — | — | — | — | — | — |
|  | B-4 | — | — | — | — | — | — | — | — | — | — | — |
|  | B-6 | — | — | — | — | — | — | — | — | — | — | — |
|  | B-9 | — | — | — | — | — | — | — | — | — | — | — |
|  | B-11 | — | — | — | — | — | — | — | — | — | — | — |
|  | B-3 | 1 | 10 | — | — | — | — | — | — | — | — | — |
|  | B-21 | — | — | 1 | — | — | — | — | — | — | — | — |
|  | B-24 | — | — | — | 1 | — | — | — | — | — | — | — |
|  | B-30 | — | — | — | — | 1 | — | — | — | — | — | — |
|  | B-31 | — | — | — | — | — | 1 | — | — | 0.5 | 0.1 | 0.3 |
|  | B-38 | — | — | — | — | — | — | 1 | — | — | — | — |
|  | Cyanine 1 | — | — | — | — | — | — | — | — | — | — | — |
|  | Cyanine 2 | — | — | — | — | — | — | — | — | — | — | — |
|  | Diimmonium | — | — | — | — | — | — | — | — | — | — | — |
| Dispersant S32000 [part] |  | 1 | 10 | 0.4 | 0.4 | 0.4 | 0.4 | 0.4 | 0.2 | 0.2 | 0.2 | 0.2 |
| Volume average particle diameter of coloring agent [nm] |  | 16 | 13 | 99 | 103 | 152 | 136 | 119 | 96 | 114 | 110 | 97 |
| Radically polymerizable monomer [part] | Monofunctional | Monomer A | 20 | 20 | 20 | 20 | 20 | 20 | 20 | — | — | — | — |
|  |  | Monomer B | 7.8 | 8 | 8.4 | 8.4 | 8.4 | 8.4 | 8.4 | 14 | 14 | 14 | 14 |
|  |  | Monomer C | — | — | — | — | — | — | — | 20 | 20 | 20 | 20 |
|  |  | Monomer D | — | — | — | — | — | — | — | — | — | — | — |
|  | Polyfunctional | Monomer E | 60 | 42 | 60 | 60 | 60 | 60 | 60 | — | — | — | — |
|  |  | Monomer F | — | — | — | — | — | — | — | 55 | 55 | 55 | 55 |
|  |  | Monomer G | — | — | — | — | — | — | — | — | — | — | — |
| Total amount ratio of polyfunctional/monomer [%] |  | 68.3 | 59.9 | 67.9 | 67.9 | 67.9 | 67.9 | 67.9 | 61.9 | 61.9 | 61.9 | 61.9 |
| Radical polymerization initiator [part] | Initiator A | 6 | 6 | 6 | 6 | 6 | 6 | 6 | — | — | — | — |
|  | Initiator B | — | — | — | — | — | — | — | 4.8 | 4.8 | 4.8 | 4.8 |
|  | Initiator C | — | — | — | — | — | — | — | 1.4 | 1.4 | 1.4 | 1.4 |
| Coloring agent sensitizer [part] | Sensitizer A | 4 | 4 | 4 | 4 | 4 | 4 | 4 | — | — | — | — |
|  | Sensitizer B | — | — | — | — | — | — | — | 4 | 4 | 4 | 4 |
|  | Sensitizer C | — | — | — | — | — | — | — | — | — | — | — |
| Ratio of coloring agent sensitizer/coloring agent |  | 4 | 0.4 | 4 | 4 | 4 | 4 | 4 | 8 | 8 | 8 | 8 |
| Polymerization inhibitor UV12 [part] |  | 0.1 | 0.1 | 0.1 | 0.1 | 0.1 | 0.1 | 0.1 | 0.1 | 0.1 | 0.1 | 0.1 |
| Surfactant BYK307 [part] |  | 0.1 | 0.1 | 0.1 | 0.1 | 0.1 | 0.1 | 0.1 | 0.1 | 0.1 | 0.1 | 0.1 |
| Evaluation | Jettability | A | A | A | A | A | A | A | A | A | A | A |
|  | Exposure resistance | B | A | A | A | A | A | A | A | A | A | A |
|  | Light resistance | B | A | A | A | A | A | A | A | A | A | A |
|  | Migration property | A | A | A | A | A | A | A | A | A | A | A |

TABLE 3

|  |  |  | Comparative example 1 | Comparative example 2 | Comparative example 3 | Comparative example 4 | Comparative example 5 | Comparative example 6 |
|---|---|---|---|---|---|---|---|---|
| Coloring agent [part] |  | B-1 | 1 | — | — | — | — | — |
|  |  | B-37 | — | 1 | — | — | — | — |
|  |  | B-4 | — | — | 0.05 | — | — | — |
|  |  | B-6 | — | — | — | — | — | — |
|  |  | B-9 | — | — | — | — | — | — |
|  |  | B-11 | — | — | — | — | — | — |
|  |  | B-3 | — | — | — | — | — | — |
|  |  | B-21 | — | — | — | — | — | — |
|  |  | B-24 | — | — | — | — | — | — |
|  |  | B-30 | — | — | — | — | — | — |
|  |  | B-31 | — | — | — | — | — | — |
|  |  | B-38 | — | — | — | — | — | — |
|  |  | Cyanine 1 | — | — | — | 2 | — | — |
|  |  | Cyanine 2 | — | — | — | — | 5 | — |
|  |  | Diimmonium | — | — | — | — | — | 1 |
| Dispesant S32000 [part] |  |  | 0.1 | 0.4 | 0.8 | 0.8 | 2 | 0.4 |
| Volume average particle diameter of coloring agent [nm] |  |  | 830 | 129 | <10 | 110 | 140 | 108 |
| Radically polymerizable monomer [part] | Monofunctional | Monomer A | 20 | 20 | 20 | 20 | — | 20 |
|  |  | Monomer B | 8.8 | 8.4 | 8.9 | 7 | 7.8 | 8.4 |
|  |  | Monomer C | — | — | — | — | 20 | — |
|  |  | Monomer D | — | — | — | — | — | — |
|  | Polyfunctional | Monomer E | 60 | 64 | 60 | 60 | — | 60 |

TABLE 3-continued

|  |  | Comparative example 1 | Comparative example 2 | Comparative example 3 | Comparative example 4 | Comparative example 5 | Comparative example 6 |
|---|---|---|---|---|---|---|---|
|  | Monomer F | — | — | — | — | 55 | — |
|  | Monomer G | — | — | — | — | — | — |
| Total amount ratio of polyfunctional/monomer [%] | | 67.6 | 69.3 | 67.5 | 69 | 66.4 | 67.9 |
| Radical polymerization initiator [part] | Initiator A | 6 | 6 | 6 | 6 | — | 6 |
|  | Initiator B | — | — | — | — | 4.8 | — |
|  | Initiator C | — | — | — | — | 1.2 | — |
| Coloring agent sensitizer [part] | Sensitizer A | 4 | — | 4 | 4 | — | 4 |
|  | Sensitizer B | — | — | — | — | 4 | — |
|  | Sensitizer C | — | — | — | — | — | — |
| Ratio of coloring agent sensitizer/coloring agent | | 4 | — | 80 | 2 | 0.8 | 4 |
| Polymerization inihibitor UV12 [part] | | 0.1 | 0.1 | 0.1 | 0.1 | 0.1 | 0.1 |
| Surfactant BYK307 [part] | | 0.1 | 0.1 | 0.1 | 0.1 | 0.1 | 0.1 |
| Evaluation | Jettability | D | A | A | A | A | A |
|  | Exposure resistance | — | B | C | C | B | C |
|  | Light resistance | — | B | D | D | C | D |
|  | Migration property | — | D | — | — | — | — |

As shown in Tables 1 and 2, in Examples in which a radical polymerization-based photocurable ink composition was prepared using particles of a squarylium coloring agent and a coloring agent sensitizer, fastness (exposure resistance and light resistance of an image) to light exposed during or after image recording was excellent, good IR absorption ability was exhibited, and it was possible to obtain an infrared absorbing image which was well cured by the LED light.

For example, as in Examples 1 to 7, in a case where the volume average particle diameter of the particles of the squarylium coloring agent is in a range of 10 nm to 400 nm, exposure resistance during image recording was high, light resistance after recording was excellent, and jettability was also good. In Example 8 in which the amount of the dispersant was reduced, the particle diameter of the particles of the squarylium coloring agent was large, and the jettability tended to decrease slightly. In addition, in Example 1 and the like, in which the molecular weight of the coloring agent sensitizer was 1000 or more, good results were obtained in terms of migration property compared with Examples 8 to 11, in which the molecular weight of the coloring agent sensitizer was relatively small.

On the other hand, in Comparative Example 1, since the amount of the dispersant was small relative to the amount of the coloring agent, the volume average particle diameter of the particles of the squarylium coloring agent was too large, which hindered the jettability.

In Comparative Example 2 in which the coloring agent sensitizer was not used, the migration property was significantly reduced.

In addition, in Comparative Example 3 in which the volume average particle diameter of the particles of the squarylium coloring agent was less than 10 nm, the result was inferior in fastness (exposure resistance and light resistance of an image) to light exposed during or after image recording.

Further, in Comparative Examples 4 to 6 in which a coloring agent other than the squarylium coloring agent was used, light resistance of the infrared absorbing image was inferior.

The disclosure of Japanese Patent Application No. 2019-066146 filed on Mar. 29, 2019 is incorporated in the present specification by reference. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. A photocurable ink composition comprising:
   particles of a squarylium coloring agent represented by Formula (1);
   a radically polymerizable monomer;
   a radical polymerization initiator; and
   a coloring agent sensitizer,
   wherein a volume average particle diameter of the particles of the squarylium coloring agent is 10 nm to 400 nm,

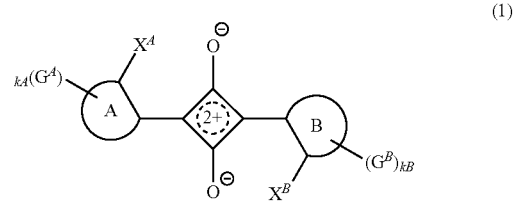

(1)

wherein in Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to nA, kB represents an integer of 0 to nB, nA represents an integer that is a maximum number of $G^A$ the ring A can have as its substituent, nB represents an integer that is a maximum number of $G^B$ the ring B can have as its substituent, $X^A$ and $G^A$ or $X^B$ and $G^B$ may be bonded to each other to form a ring, and in a case where a plurality of $G^A$'s or a plurality of $G^B$'s are present, the plurality of $G^A$'s bonded to the ring A and the plurality of $G^B$'s bonded to the ring B may be bonded to each other to form a ring structure,
   wherein a ratio of a content of the coloring agent sensitizer to a content of the squarylium coloring agent is in a range of from 1 to 20 on a mass basis, and
   wherein a content of the coloring agent sensitizer in the photocurable ink composition is from 1.0% by mass to 15.0% by mass with respect to a total amount of the photocurable ink composition.

2. The photocurable ink composition according to claim 1,
wherein the coloring agent sensitizer includes at least one of a thioxanthone-based compound or a thiochromanon-based compound.

3. The photocurable ink composition according to claim 1,
wherein at least one of the coloring agent sensitizer has a molecular weight of 1000 or more.

4. The photocurable ink composition according to claim 1,
wherein a content of the squarylium coloring agent is 0.1% by mass to 20% by mass with respect to a total mass of the ink composition.

5. The photocurable ink composition according to claim 1,
wherein the radically polymerizable monomer includes a bi- or higher functional radically polymerizable monomer, and
a content of the bi- or higher functional radically polymerizable monomer is 50% by mass or more with respect to a total content of the radically polymerizable monomer.

6. The photocurable ink composition according to claim 1,
wherein the particles of the squarylium coloring agent are present in a dispersed state.

7. The photocurable ink composition according to claim 1,
wherein the radically polymerizable monomer includes a monofunctional radically polymerizable monomer and at least one monomer selected from the group consisting of a bifunctional radically polymerizable monomer and a trifunctional radically polymerizable monomer.

8. The photocurable ink composition according to claim 1,
wherein the photocurable ink composition is used for ink jet recording.

9. An image recording method comprising:
applying the photocurable ink composition according to claim 1 to a base material; and
irradiating the photocurable ink composition applied to the base material with light by a light emitting diode to record an infrared absorbing image.

* * * * *